(12) United States Patent
Curtiss et al.

(10) Patent No.: US 12,637,776 B2
(45) Date of Patent: May 26, 2026

(54) ELECTROCHEMICAL SYNTHESIS METHOD FOR LITHIUM SUPEROXIDE

(71) Applicant: UCHICAGO ARGONNE, LLC, Chicago, IL (US)

(72) Inventors: Larry A. Curtiss, Downers Grove, IL (US); Hsien-Hau Wang, Downers Grove, IL (US); Khalil Amine, Oakbrook, IL (US); Samuel Plunkett, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 917 days.

(21) Appl. No.: 17/950,321

(22) Filed: Sep. 22, 2022

(65) Prior Publication Data

US 2024/0110292 A1 Apr. 4, 2024

(51) Int. Cl.

| | |
|---|---|
| *C25B 1/14* | (2006.01) |
| *C25B 11/032* | (2021.01) |
| *C25B 11/043* | (2021.01) |
| *C25B 11/093* | (2021.01) |
| *H01M 4/38* | (2006.01) |
| *H01M 4/48* | (2010.01) |
| *H01M 10/0525* | (2010.01) |

(52) U.S. Cl.
CPC .............. *C25B 1/14* (2013.01); *C25B 11/032* (2021.01); *C25B 11/043* (2021.01); *C25B 11/093* (2021.01); *H01M 4/382* (2013.01); *H01M 4/48* (2013.01); *H01M 10/0525* (2013.01)

(58) Field of Classification Search
CPC ....... C25B 1/14; C25B 11/032; C25B 11/043; C25B 11/093; H01M 4/382; H01M 4/48; H01M 10/0525; H01M 2300/0028; Y02E 60/10
See application file for complete search history.

(56) References Cited

U.S. PATENT DOCUMENTS

| | | | | |
|---|---|---|---|---|
| 4,049,532 A | * | 9/1977 | Clerbois ............... | C25B 11/093 427/404 |
| 9,553,316 B2 | | 1/2017 | Lu et al. | |
| 2025/0354273 A1 | * | 11/2025 | Curtiss ................. | C25B 11/089 |

OTHER PUBLICATIONS

Lu et al. ("A lithium-oxygen battery based on lithium superoxide," Nature 2016, 529, 377-383). (Year: 2019).*
Lu et al. ("A lithium-oxygen battery based on lithium superoxide," Nature 2016, 529, supporting information). (Year: 2019).*
Jin et al. ("Aromaticity of Bare Iridium Trimers and Ir3M0/+ and Ir3M21+/3+ Bimetallic Clusters [M = Li, Na, K, Be, and Ca]," J. Structural Chem. 2018, 59, 1032-1043). (Year: 2018).*
ACS Energy Letters, 2018, 3, pp. 1105-1109, "Identification and Implications of Lithium Superoxide in Li—O2 Batteries.".

(Continued)

*Primary Examiner* — James Lin
*Assistant Examiner* — Kevin Sylvester
(74) *Attorney, Agent, or Firm* — Foley & Lardner LLP

(57) ABSTRACT

The present invention provides, in part, methods and processes for the production of lithium superoxide ($LiO_2$) which is free of other lithium-oxygen compounds, as well as compositions and electrochemical cells comprising lithium superoxide (e.g., lithium superoxide that is free of other lithium-oxygen compounds).

12 Claims, 9 Drawing Sheets

(56) References Cited

OTHER PUBLICATIONS

Agyeman, D.A., Pd-Impregnanted NiCo2O4 Nanosheets/Porous Carbon Composites as a Free-Standing and Binder-Free Catalyst for a High Energy Lithium-Oxygen Battery, J. Mater. Chem. A, 2017, 5, pp. 22234-22241.

Allen, J. M., et al. "Synthesis, Isolation, and Characterization of Trisodium Tricarbonyliridate (3-), Na3[Ir(CO)3]. Initial Studies on its derivative chemistry and structural characterizations of trans-[IR(CO)3(EPh3)2-, E = Ge, Sn, and trans-[Co(CO)3(SnPh3)2]-1,", Inorg. Chem. 2001, 40, pp. 5279-5284.

Aurbach, D., et al., "Advances in understanding mechanisms underpinning lithium-air batteries," Nature Energy, vol. 1, Sep. 2016, pp. 1-11.

Baumgartner, J., et al., "Nucleation and growth of magnetite from solution," Nature Materials, vol. 12, Apr. 2013, pp. 310-314.

Carino, A., et al., "Thermodynamic-Kinetic precipitation modeling. A case study: The amorphous calcium carbonate (ACC) precipitation pathway unravelled", Cryst. Growth Des., 2017, 17, pp. 2006-2015.

Chen, J., et al., "The role of transition metal interfaces on the electronic transport in lithium-air batteries," Catalysis Today, 165 (2011), pp. 2-9.

Donkersloot, H.C., et al., "The crystal structure of IrLi, Ir3Li and LiRh3," Journal of the Less-Common Metals, 50 (1976), pp. 279-282.

Ellis, J.E., et al., "Metal carbonyl anions: from [Fe(CO)4]2 to [Hf(CO)6]2 and beyond," Organometallics, 2003, 22, pp. 3322-3338.

Flinn, R.A., et al., "Atomic and Ionic Radii of the Elements," Engineering Materials and Their Applications, Houghton Mifflin Company, Boston, 1975, pp. 1-2.

Galiote, N.A., et al., "Role platinum nanoparticles play in the kinetic mechanism of oxygen reduction reaction in nonaqueous solvents," J. Phys. Chem. C 2018, 122, pp. 15826-15834.

Gittleson, F.S., et al, "Operando observation of the gold-electrolyte interface in Li—O2 batteries," ACS, Appl. Mater. Interfaces, 2014, 6, pp. 19017-19025.

Halder, A., et al, "In situ formed Ir3Li nanoparticles as active cathode material in Li-Oxygen batteries," J. Phys. Chem. A, 2019, 123, pp. 10047-10056.

Kresse, G., et al., "Efficiency of ab-initio total energy calculations for metals and semiconductors using a plane-wave basis set," Computational Materials Science, 6 (1996), pp. 15-50.

Lee, B., et al., "Theoretical evidence for low charging overpotentials of superoxide discharge products in metal-oxygen batteries," Chem. Mater. 2015, 27, pp. 8406-8413.

Li, S., et al., "First-principles study of the charge transport mechanisms in lithium superoxide," Chem. Mater. 2017, 29, pp. 2202-2210.

Liu, T., et al. "Current challenges and routes forward for nonaqueous lithium-air batteries," Chem. Rev. 2020, 120, pp. 6558-6625.

Lu, J., et al., "A lithium-oxygen battery based on lithium superoxide," Nature, Jan. 21, 2016, vol. 529, pp. 377-383.

Lu, J., et al., "Effect of the size-selective silver clusters on lithium peroxide morphology in lithium-oxygen batteries," Nature Communications, 2014, pp. 1-8.

Nefedov, R.A., et al., "Problem of the lithium peroxide thermal stability," Materials Science and Engineering, 112, (2016) pp. 1-7.

Perumbilavil, S., et al., "White light Z-scan measurements of ultrafast optical nonlinearity in reduced graphene oxide nanosheets in the 400-700 nm region," Applied Physics Letters, 107, 051104 (2015), pp. 1-6.

Plunkett, S.T., et al. "Charge transport properties of lithium superoxide in Li—O2 batteries," ACS Appl. Energy Mater. 2020, 3, pp. 12575-12583.

Plunkett, S.T., et al., "Electronic properties of Ir3Li and ultra-nanocrystalline lithium superoxide formation," Nano Energy 90 (2021), pp. 1-10.

Powell, R.W., et al., "Thermal conductivities and electrical resistivities of the platinum metals," Platinum Metals Rev., 1962, 6, pp. 138-143.

Samira, S., et al., "Nonprecious metal catalysts for tuning discharge product distribution at solid-solid interfaces of aprotic Li—O2 batteries," Chem. Mater. 2019, 31, pp. 7300-7310.

Sangster, J., et al., "The Ir—Li (Iridium-Lithium) System," Journal of Phase Equilibria, vol. 13, No. 1 (1992), pp. 59-62.

Sun, B., et al., "Porous graphine nanoarchitectures: an efficient catalyst for low charge-overpotential, long life, and high capacity lithium-oxygen batteries," Nano. Lett. 2014, 14, pp. 3145-3152.

Tang, W., et al, "A grid-based Bader analysis algorithm without lattice bias," J. Phys. Condens. Matter, 21 (2009), pp. 1-8.

Thompson, A.C., et al., "X-Ray data booklet," Center for X-Ray Optics Advanced light Source, Second edition, Jan. 2001, pp. 1-453.

Wang, H., et al., Lithium superoxide hydrolysis and relevance to Li—O2 batteries, J. Phys. Chem. C, 2017, 121, pp. 9657-9661.

Xu, J., et al., "Tailoring deposition and morphology of discharge products towards high-rate and long-life lithium-oxygen batteries," Nature Communications, 2013, pp. 1-10.

Yao, K., et al., "Thermal stability of Li2O2 and Li2O for Li-Air batteries: In situ XRD and XPS Studies," Journal of the Electrochemical Society, 160, 6, (2013) pp. A824-A831.

* cited by examiner

ELECTROCHEMICAL SYNTHESIS METHOD FOR LITHIUM SUPEROXIDE

STATEMENT OF GOVERNMENT INTEREST

This invention was made with government support under Contract No. DE-AC02-06CH11357 awarded by the U.S. Department of Energy. The government has certain rights in the invention.

TECHNICAL FIELD

The present technology is generally related to the production of lithium superoxide ($LiO_2$) which is free of other lithium-oxygen compounds.

BACKGROUND

There has been a significant interest in lithium superoxide ($LiO_2$), due to recent research into lithium-oxygen batteries, and the possibility that lithium superoxide may be an intermediate in the formation of lithium peroxide in lithium air cells. The first step in the oxygen reduction reaction (ORR) in a lithium air cell has been speculated to be the reduction of $O_2$ to $O_2^-$, through a one-electron transfer, which is followed by the reaction with a lithium cation to form $LiO_2$ (Eqs. 1 and 2):

$$O_2 + e^- \rightarrow O_2^- \qquad \text{(Eq. 1)}$$

$$O_2^- + Li^+ \rightarrow LiO_2 \qquad \text{(Eq. 2)}$$

Lithium peroxide ($Li_2O_2$) can be then formed by the reaction of $LiO_2$ with $Li^+$ through a second electron transfer, as shown in Eq. 3:

$$LiO_2 + e^- + Li^+ \rightarrow Li_2O_2 \qquad \text{(Eq. 3)}$$

Alternatively, $Li_2O_2$ may be generated via the disproportionation reaction of $LiO_2$:

$$2LiO_2 \rightarrow Li_2O_2 + O_2 \qquad \text{(Eq. 4)}$$

SUMMARY

The present technology is based, in part, on the surprising discovery that lithium superoxide ($LiO_2$) can be prepared and stabilized at ambient temperature using the methods and compositions described herein.

Provided herein are methods and processes for the production of lithium superoxide ($LiO_2$) which is free of other lithium-oxygen compounds, as well as compositions and electrochemical cells comprising lithium superoxide (e.g., lithium superoxide which is free of other lithium-oxygen compounds).

In one aspect, disclosed herein is a process of forming $LiO_2$, the process comprising: providing an electrochemical cell comprising a porous oxygen cathode, a lithium anode, a current collector, and an electrolyte; and discharging the electrochemical cell to form a discharge product; wherein: the porous oxygen cathode comprises a gas-diffusion layer electrode coated with a mixture of reduced graphene oxide (rGO) and $Ir_3Li$; the discharge product comprises $LiO_2$; and the discharge product is substantially free of $Li_2O$ and $Li_2O_2$.

In another aspect, disclosed herein is a composition comprising $LiO_2$, reduced graphene oxide (rGO), and $Ir_3Li$, wherein: a mass ratio of $rGO:Ir_3Li$ is from about 1:1 to 1:0.00005; the $LiO_2$ comprises primary $LiO_2$ particles formed into secondary $LiO_2$ particles; the $LiO_2$ primary particles are less than about 5 nm; the $LiO_2$ secondary particles are greater than 200 nm; and the composition is substantially free of $Li_2O_2$ and $Li_2O$.

In another aspect, disclosed herein is an electrochemical cell comprising: an anode comprising lithium metal; a cathode comprising $LiO_2$, reduced graphene oxide (rGO), and $Ir_3Li$; and an electrolyte; wherein: a mass ratio of $rGO:Ir_3Li$ is from about 1:1 to about 1:0.00005; and the cathode is substantially free of $Li_2O_2$ and $Li_2O$.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

DETAILED DESCRIPTION

Figures 1A, 1B, 1C, 1D:
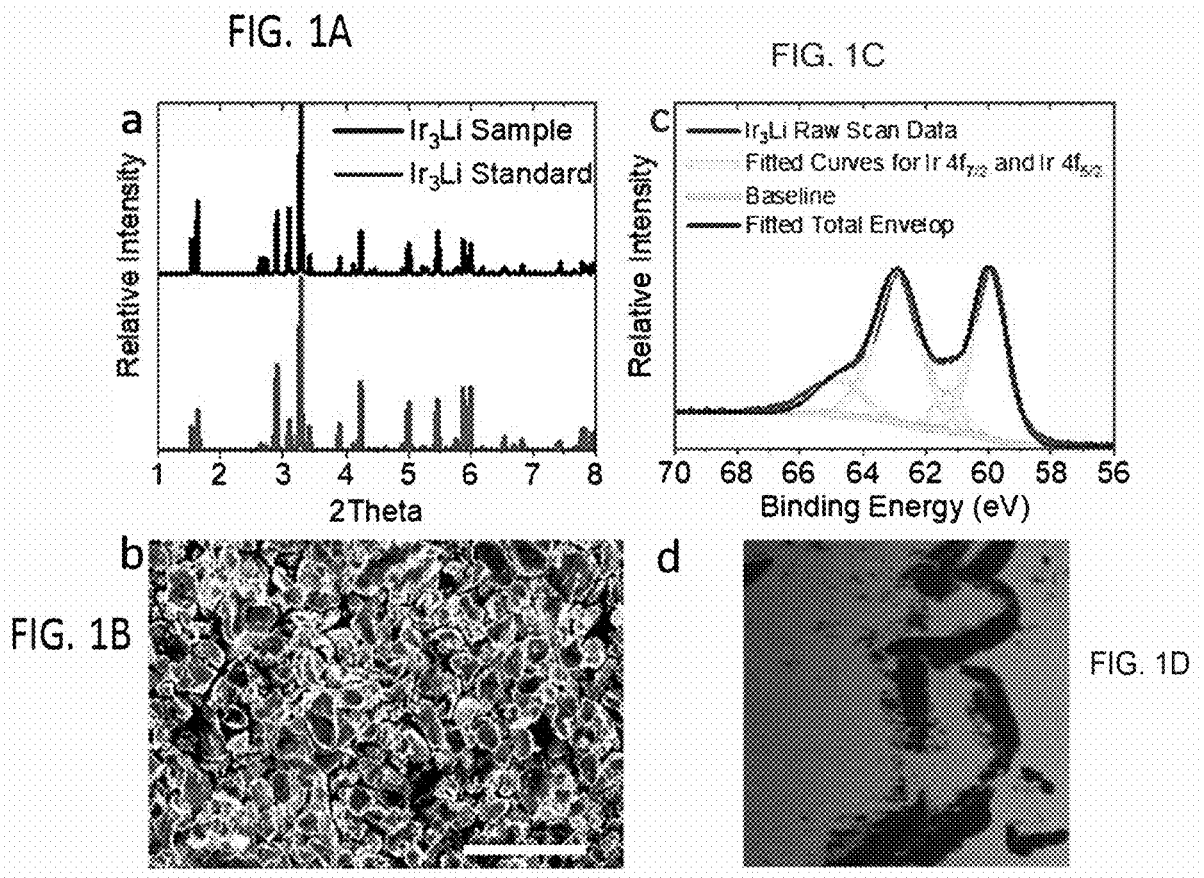
FIG. 1A shows the XRD spectra of $Ir_3Li$ sample with reference to ICSD standard (104488).
FIG. 1B shows the SEM image of $Ir_3Li$ powders post grinding with mortar and pestle. Scale bar is 10 μm.
FIG. 1C shows the XPS spectra of $Ir_3Li$ powders illustrating two components of a Ir $4f_{7/2}$ peak at binding energy (BE) 59.98 eV ($Ir_3^-$) and 61.28 eV [Ir(0)] (Both in gray traces).
FIG. 1D shows the 5×5 μm current image of a conductive AFM scan indicating high conductivity in bright color throughout the sample.

Current lithium-oxygen (Li—$O_2$) batteries suffer from large charge overpotentials related to electronic resistivity of the insulating lithium peroxide ($Li_2O_2$) discharge product. One potential solution to this challenge is the stabilization of the lithium superoxide ($LiO_2$) discharge intermediate, which has much higher electronic conductivity compared to $Li_2O_2$. Cathodes based on small iridium (Ir) nanoparticles have been recently used in a Li—$O_2$ battery to successfully stabilize the $LiO_2$ product, however, the $LiO_2$ had a short lifetime. Accordingly, there is a need for developing new methods for the preparation and/or stabilization of lithium superoxide ($LiO_2$), as well as compositions comprising the stabilized lithium superoxide ($LiO_2$) and use thereof.

The present disclosure provides processes for forming lithium superoxide ($LiO_2$), as well as compositions and/or electrochemical cells comprising the resulting lithium superoxide ($LiO_2$). The lithium superoxide ($LiO_2$) described herein can be free of other lithium-oxygen compounds.

As used herein, the term "approximately" or "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. For example, in certain embodiments, the term "approximately" or "about" refers to a range of values that fall within 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the phrase "free of" or "substantially free of" means that in the compositions, the $Li_2O_2$ and/or the $Li_2O$ are undetectable using spectroscopic methods. For example, "free of" or "substantially free of" may mean greater than 98% purity of the $LiO_2$, greater than 99% purity of the $LiO_2$, or greater than 99.9% purity of the $LiO_2$. In some embodiments, "free of" or "substantially free of" may mean 100% purity of the $LiO_2$.

Throughout the description and claims of this specification the word "comprise" and other forms of the word, such as "comprising" and "comprises", means including but not limited to, and is not intended to exclude, for example, other additives, components, integers, or steps.

"Optional" or "optionally" means that the subsequently described event or circumstance may or may not occur, and that the description includes instances where the event or circumstance occurs and instances where it does not.

As used herein, alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Alkyl groups may be substituted or unsubstituted. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Alkyl groups described herein having two or more points of attachment (i.e., divalent, trivalent, or polyvalent) within the compound of the present technology are designated by use of the suffix, "ene." For example, divalent alkyl groups are alkyl"ene" ("alkylene") groups.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Methods of Preparation

In one aspect, provided herein is a process of forming lithium superoxide ($LiO_2$) using an electrochemical cell. For example, the process may comprise: providing an electrochemical cell, and discharging the electrochemical cell to form a discharge product (e.g., a discharge product comprising $LiO_2$). In some embodiments, the electrochemical cell comprises a porous oxygen cathode (e.g., a porous oxygen carbon cathode), a lithium anode, a current collector, and an electrolyte. In some embodiments, the porous oxygen cathode comprises a gas-diffusion layer electrode coated with a mixture of reduced graphene oxide (rGO) and $Ir_3Li$.

In some embodiments, the electrochemical cell comprises a porous oxygen carbon cathode comprising a gas-diffusion layer electrode coated with a mixture of reduced graphene oxide (rGO) and $Ir_3Li$. In some embodiments, a mass ratio of $rGO:Ir_3Li$ in the mixture is from about 1:1 to about 1:0.00005, including about 1:1, about 1:0.1, about 1:0.001, about 1:0.0001, about 1:0.00005, or any value therebetween. In some embodiments, a mass ratio of $rGO:Ir_3Li$ in the mixture is about 1:1. In some embodiments, a loading of the mixture on the porous oxygen carbon cathode is from about 0.2 to about 1.0 mg/cm$^2$, including about 0.2 mg/cm$^2$, about 0.4 mg/cm$^2$, about 0.6 mg/cm$^2$, about 0.8 mg/cm$^2$, about 1.0 mg/cm$^2$, or any value therebetween.

In some embodiments, the $Ir_3Li$ described herein can be prepared by subjecting a mixture of $Ir^0$ (e.g., $Ir^0$ powder) and $Li^0$ (e.g., $Li^0$ foil) to elevated temperature to form the $Ir_3Li$. The resulting $Ir_3Li$ then can be mixed with reduced graphene oxide (rGO) to form a mixture. In some embodiments, the elevated temperature is a temperature from about 600° C. to 1000° C., including about 600° C., about 700° C., about 800° C., about 900° C., about 1000° C., or any value therebetween. In some embodiments, the subjecting is carried out under an inert atmosphere. In some embodiments, the subjecting is carried out for greater than 3 days or greater than 5 days.

In some embodiments, the $Ir_3Li$ described herein comprises $Ir_3Li$ particles having a particle size of from about 200 nm to about 5 um, including about 200 nm, about 400 nm, about 600 nm, about 800 nm, about 1 um, about 2 um, about 3 um, about 4 um, or about 5 um, or any value therebetween. In some embodiments, the $Ir_3Li$ described herein comprises $Ir_3Li$ particles having a particle size of less than about 200 nm. In some embodiments, the $Ir_3Li$ described herein comprises $Ir_3Li$ particles having a particle size of greater than about 5 um, In some embodiments, the electrochemical cell comprises electrolytes. In some embodiments, the electrolytes are aprotic and may include a solvent and a salt (e.g., lithium salt) in addition to other additives that may be present.

The solvent may be an aprotic solvent such as an ether-based solvent, a fluorinated ether-based solvent, an oligo (ethylene oxide) solvent, or a mixture of any two or more thereof. Suitable solvents include, but are not limited to, glyme, diglyme, tetrahydrofuran, tetraethyletheylene glycol dimethylether, tri(ethylene glycol)-substituted methyltrimethyl silane (1NM3), ethylene glycol-substituted methyltrimethyl silane (1NM1), and di(ethylene glycol)-substituted methyltrimethyl silane (1NM2). Other suitable solvents include, but are not limited to, acetonitrile (ACN), dimethyl sulfoxide (DMSO), dimethylformamide (DMF), triethyl phosphate, N,N-dimethylacetamide (DMA), N-methyl pyrrolidone (NMP), methoxybenzene, siloxanes, and ionic liquids.

Suitable salts include but are not limited to $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or any combination of two or more thereof, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

Discharging an electrochemical cell described herein can form a discharge product comprising $LiO_2$. The discharging may be conducted in the presence of $O_2$. The discharging may further include cycling of the electrochemical cell, i.e. discharging and charging cycles.

The electrochemical cell can be cycled for a predetermined time, and at a predetermined capacity and current density. For example, a single cycle of the cell may be conducted for greater than 1 hour. In some embodiments, the cycle is conducted for from 1 hour to 48 hours, including from 2 hours to 24 hours, including from 12 hours to 24 hours, including 1 hour, 3 hours, 6 hours, 9 hours, 12 hours, 15 hours, 18 hours, 21 hours, or 24 hours, or any value therebetween. In some embodiments, the cycling (including the discharging) is conducted at a capacity of from about 100 mAh/g to about 2000 mAh/g, including about 100 mAh/g, about 200 mAh/g, about 300 mAh/g, about 400 mAh/g, about 500 mAh/g, about 600 mAh/g, about 700 mAh/g, about 800 mAh/g, about 900 mAh/g, about 1000 mAh/g, about 1100 mAh/g, about 1200 mAh/g, about 1300 mAh/g, about 1400 mAh/g, about 1500 mAh/g, about 1600 mAh/g, about 1700 mAh/g, about 1800 mAh/g, about 1900 mAh/g, or about 2000 mAh/g, or any value therebetween. In some embodiments, the cycling (including the discharging) is conducted at a current of from about 10 mA/h to about 500 mA/h, including about 10 mA/h, about 50 mA/h, about 100 mA/h, about 150 mA/h, about 200 mA/h, about 250 mA/h, about 300 mA/h, about 350 mA/h, about 400 mA/h, about 450 mA/h, or about 500 mA/h, or any value therebetween.

In some embodiments, the discharge product comprises $LiO_2$. In some embodiments, the discharge product is substantially free of $Li_2O$ and $Li_2O_2$. As noted above, "free of" indicates, at least in some embodiments, that the $LiO_2$ is spectroscopically pure. For example, as described herein, the discharge product can be characterized using Raman spectroscopy, titration, Ultraviolet-visible spectroscopy, and transmission electron microscopy (TEM) study.

In some embodiments, the $LiO_2$ (e.g., the $LiO_2$ prepared by a method described herein) is crystalline $LiO_2$. In some embodiments, the $LiO_2$ (e.g., the crystalline $LiO_2$) is in a form of particles such as secondary particles. In some embodiments, the $LiO_2$ secondary particles comprises $LiO_2$ primary particles and amorphous regions between said $LiO_2$ primary particles. In some embodiments, the $LiO_2$ secondary particles described herein have a particle size of greater than about 100 nm, including greater than about 200 nm, greater than about 400 nm, greater than about 600 nm, or greater than about 1 um. In some embodiments, the $LiO_2$ primary particles described herein have a particle size of less than about 5 nm, less than about 10 nm, or less than about 15 nm. In some embodiments, the primary $LiO_2$ and the secondary $LiO_2$ are crystalline.

The lithium superoxide produced may find application in lithium air batteries, as a cathode material for a closed Li-air battery systems without need for a source of oxygen for the storage of oxygen, in solid form with low molecular weight, and as a lithium storage material to pre-lithiate high-energy anodes.

Compositions and/or Electrochemical Cells

In another aspect, provided herein is a composition comprising lithium superoxide ($LiO_2$), reduced graphene oxide (rGO), and $Ir_3Li$. In any of the embodiments described herein, the composition may be substantially free of other lithium-oxygen compounds such as lithium peroxide ($Li_2O_2$) or lithium oxide ($Li_2O$). As noted above, "free of" indicates, at least in some embodiments, that the $LiO_2$ is spectroscopically pure. As described herein, the mass of $Li_2O_2$ present on a discharged $Ir_3Li$-rGO electrode can be determined using titration with titanium oxysulfate solution $Ti(IV)OSO_4$ coupled with Ultraviolet-visible spectroscopy (UV-Vis). Additionally, the TEM characterization can provide further evidence that the discharge product is mainly $LiO_2$, and upon high energy electron irradiation, decompose to form $Li_2O$.

In some embodiments, a mass ratio of $rGO:Ir_3Li$ in the composition is from about 1:1 to about 1:0.00005, including about 1:1, about 1:0.1, about 1:0.001, about 1:0.0001, about 1:0.00005, or any value therebetween. In some embodiments, a mass ratio of $rGO:Ir_3Li$ in the composition is about 1:1.

In some embodiments, the $Ir_3Li$ described herein comprises $Ir_3Li$ particles having a particle size of from about 200 nm to about 5 um, including about 200 nm, about 400 nm, about 600 nm, about 800 nm, about 1 um, about 2 um, about 3 um, about 4 um, or about 5 um, or any value therebetween. In some embodiments, the $Ir_3Li$ described herein comprises $Ir_3Li$ particles having a particle size of less than about 200 nm. In some embodiments, the $Ir_3Li$ described herein comprises $Ir_3Li$ particles having a particle size of greater than about 5 um.

In some embodiments, the $LiO_2$ is crystalline $LiO_2$. In some embodiments, the $LiO_2$ (e.g., the crystalline $LiO_2$) comprises primary $LiO_2$ particles formed into secondary $LiO_2$ particles. In some embodiments, the $LiO_2$ secondary particles further comprises amorphous regions between the $LiO_2$ primary particles. In some embodiments, the $LiO_2$ secondary particles described herein have a particle size of greater than about 100 nm, including, greater than about 200 nm, greater than about 400 nm, greater than about 600 nm, or greater than about 1 um. In some embodiments, the $LiO_2$ primary particles described herein have a particle size of less than about 5 nm, less than about 10 nm, or less than about 15 nm. In some embodiments, the primary $LiO_2$ and the secondary $LiO_2$ are crystalline.

The $LiO_2$ described herein (e.g., the $LiO_2$ included in the composition) can exhibit superior stability. For example, the $LiO_2$ may be stable after 24 hours at ambient temperature under $O_2$, Ar, or vacuum. In some embodiments, the $LiO_2$ is stable with less than 20%, less than 15%, less than 10%, or less than 5% of $LiO_2$ decomposes after 24 hours at ambient temperature under $O_2$, Ar, or vacuum. Additionally or alternatively, the $LiO_2$ may be stable under 80 kV applied voltage. In some embodiments, the $LiO_2$ is stable with less than 3%, less than 1%, or less than 0.5% of $LiO_2$ is decomposed under 80 kV applied voltage during TEM measurement.

In another aspect, provided herein is an electrochemical cell. The electrochemical cell may comprise 1) an anode comprising lithium metal; 2) a cathode comprising $LiO_2$ (e.g., the $LiO_2$ as described herein), reduced graphene oxide (rGO), and $Ir_3Li$ (e.g., the $Ir_3Li$ as described herein); and 3) an electrolyte (e.g., the electrolytes as described herein). In some embodiments, a mass ratio of $rGO:Ir_3Li$ in the electrochemical cell is from about 1:1 to about 1:0.00005, including about 1:1, about 1:0.1, about 1:0.001, about 1:0.0001, about 1:0.00005, or any value therebetween. In some embodiments, a mass ratio of $rGO:Ir_3Li$ in the electrochemical cell is about 1:1.

In some embodiments, the cathode is substantially free of $Li_2O_2$ and $Li_2O$.

EXAMPLES

The following examples illustrate some embodiments and aspects of the invention. It will be apparent to those skilled in the relevant art that various modifications, additions, substitutions, and the like can be performed without altering the spirit or scope of the invention, and such modifications and variations are encompassed with invention as defined in the claims which follow. The invention disclosed herein is further illustrated by the following examples which in no way should be construed as being limiting.

Example 1—General Methods

Provided herein are certain general methods used in the examples.

XRD characterization. Powders of $Ir_3Li$ were wax sealed in a thin quartz x-ray tube inside a glovebox filled with Ar. The XRD measurements were performed at the Argonne Advanced Photon Source (APS) sector 11-ID-C high energy diffraction beamline equipped with a 2D area detector. $CeO_2$ was used as a calibration standard. A 2D diffraction pattern was taken and then an azimuthal averaging was carried out to generate a $\theta$-$2\theta$ XRD pattern. The x-ray wavelength applied was 0.117418 Å.

TEM coupled electron diffraction (Titan, FEI) was used to analyze the synthesized $Ir_3Li$ nanopowders and the discharged $Ir_3Li$-rGO electrodes. $Ir_3Li$ TEM samples were prepared by directly adding $Ir_3Li$ powder to amorphous carbon grids supported on a 300-mesh copper (Ted Pella Inc.), then washing with ethanol dropwise to remove most of the material. The small amount of material remaining on the grid was then dried for 30 min under a heat lamp before being transferred to the TEM apparatus. Discharged $Ir_3Li$-rGO electrode TEM samples were prepared in a similar fashion; however, after cell disassembly in an argon filled glovebox the cathode was removed and dried before a doctor blade was used to scrape discharged material from the surface of the electrode. SEM (Hitachi S-4700) was used to determine $Ir_3Li$ morphology and particle size.

Raman spectroscopy (Renishaw in Via) was performed on the $Ir_3Li$ powders using a HeNe laser with a wavelength of 633 nm. Ten percent of the maximum 13 mW laser power was used, and spectrum collection was set up in a 180° reflective mode with a time constant of 200 seconds ("s"). The $Ir_3Li$ samples were mounted on a silicon chip, and the monochromator was calibrated against a diamond thin film standard (1332 $cm^{-1}$) and a silicon chip (520 $cm^{-1}$). When $LiIr_3$ was first synthesized, stability toward air was unknown. Therefore, initial Raman measurements were carried out with use of a custom-made, air-tight cell with a glass window under Ar. Raman spectroscopy was also performed on discharged cathodes. In this case, the cycled cathode was placed inside the custom cell during Raman testing to prevent oxidation of discharge products. The removal of the cathode from the electrochemical cell after testing and assembly inside the Raman cell was performed inside an argon filled glovebox.

SQUID measurements were carried out on $Ir_3Li$ pellets formed by hand pressing $Ir_3Li$ powder. Magnetic susceptibility was measured as a function of temperature between 1.8 and 110 K. EPR measurements were performed using a Bruker/IBM ER-200 X-band spectrometer equipped with a $TE_{102}$ rectangular microwave cavity. Temperature was controlled between ambient down to 100 K using of a 4111 VT variable temperature controller by evaporating liquid nitrogen through a pipe equipped with a heating coil. Temperature-dependent EPR data were collected at 9.49 GHz with a 100 kHz field modulation. A strong-pitch standard (g=2.0028) was used for g value calibration. A quartz 4 mm diameter EPR tube with a gas tight rubber septum was used as the sample/gas holder. Ultra-high purity $O_2$ (99.999%) was applied throughout the experiments. Commercial Ir fine powders suspended in water were centrifuged, filtered, washed with water then alcohol, and vacuum dried at 100° C. before analysis.

XPS measurements were carried out on a Thermo Scientific K-Alpha+ spectrometer using a micro-focused monochromatic Al Kα (1487 eV) X-ray source with a spot size of 400 μm for the surface analysis. High-resolution XPS scans were performed for C 1s, O 1s, Li 1s, and Ir 4f at the relevant binding energy range for these elements. The spectra were processed using Thermo Scientific Advantage (v. 5.977, Build 06436) post-processing software. Charge-correction was performed by referencing to the adventitious C is peak arising at 284.8 eV. Peak deconvolution of the HR-XPS spectra was performed using mixed Gaussian-Lorentzian (~30% L/G) line shapes and Smart backgrounds.

CAFM was carried out with a Digital Instrument Nanoscope Dimension 3000 with controller IV. The multimode scanning unit equipped with a CAFM module was housed inside of a glovebox. The morphology and current map were obtained simultaneously through direct contact with a conductive tip.

Electrochemical tests were carried out using a Swagelok type cell. The cell stack assembly (cathode-separator/electrolyte-anode) was assembled in an argon filled glove box with <0.1 ppm $O_2$ and <0.1 ppm $H_2O$. Swagelok cells were assembled with a 7/16" diameter Li foil anode, a ½" diameter electrolyte-soaked separator and a 7/16" positive electrode. A 1 M Li trifluoromethanesulfonate ($LiCF_3SO_3$; 99.995% trace metals basis, Aldrich Chemistry) in tetraethylene glycol dimethyl ether (TEGDME; 99%, Aldrich Chemistry) solution was used as the electrolyte for electrochemical tests. The $LiCF_3SO_3$ was dried in Ar at 110° C. for 24 h before use. TEGDME was degassed by pouring the liquid into a Schlenk flask and repeatedly evacuating and refilling with argon three times before transferring to an argon filled glove box. The degassed solvent was then dried over a bed of 3 Å molecular sieves for 1 week before use. Karl-Fischer titrations confirmed a moisture content of less than 30 ppm after drying. The prepared electrolyte was added dropwise to the separator in the electrochemical cells. After assembly, the Swagelok cell was placed inside a custom-built glass vessel via an air-tight union in the middle of the glassware. The vessel was manufactured with gas inlet and outlet valves and positive and negative copper wires sealed into the glass. Once assembled, the glassware containing the Swagelok cell was transferred to the glovebox and purged with $O_2$ at 1 bar pressure for 30 min prior to electrochemical testing. Swagelok electrochemical measurements including open circuit voltage (OCV) and galvanostatic discharge/charge tests were made with a MACCOR battery cycler. Discharge/charge tests were conducted at a constant current of 100 mA/g of cathode active mass.

All the DFT calculations were performed using VASP software that utilized the projector augmented wave (PAW) method and generalized gradient approximation (GGA) with Perdew-Burke-Ernzerhof (PBE) functionals. All the optimized structures of Ir and $Ir_3Li$ crystals were obtained with force convergence criterion on each atom of 0.01 eV/Å, energy convergence of $10^{-7}$ eV, with energy cutoff of 500 eV for plane wave basis set and a K-point mesh 8×8×8. The phonon frequencies were obtained based on a finite difference method by computing the Hessian matrix implemented in the Vienna Ab initio Simulation Package (VASP) code [13].

Example 2—Preparation and Characterization of $Ir_3Li$

$Ir_3Li$ Synthesis $Ir_3Li$ synthesis was performed similar to that reported previously [11]. Ir powder (Aldrich powders, 99.9%) and Li foil (MTI, 99.9%) were sealed in a tantalum tube inside an argon filled glovebox using a 3:1.2 Ir:Li molar ratio. The lithium foil was carefully placed over the Ir powders to keep the two reagents in close contact. The tantalum tube with a crimped lid was taken out of the glovebox and immediately sealed with an arc torch under argon. The tantalum tube was further sealed in a quartz tube under vacuum using an oxygen torch. Care was taken to keep both reagents settled on the bottom of the tantalum tube. The tantalum in quartz tube was heated to 800° C. for 8 days then furnace-cooled to room temperature. The quartz tube was broken, and the tantalum tube was placed back into the argon filled glovebox. The tantalum tube was cut and the $Ir_3Li$ product was recovered as loose gray-black powders.

$Ir_3Li$ Characterization.

10063j XRD characterization. The synthesized $Ir_3Li$ powders were analyzed with use of the XRD technique at Argonne's high resolution synchrotron beamline. Metallic Ir was not observed and the XRD spectrum was nearly identical to that of the ICSD $Ir_3Li$ standard, thereby confirming phase pure $Ir_3Li$ formation. FIG. 1A shows the $Ir_3Li$ powder XRD spectrum with comparison to the ICSD standard (104488). The observed $Ir_3Li$ (022) peak (2θ=3.2749) from the bulk synthesis formed a shoulder with the strongest $Ir_3Li$ (121) peak at 2θ=3.2924.

Figures 6A, 6B, 6C:
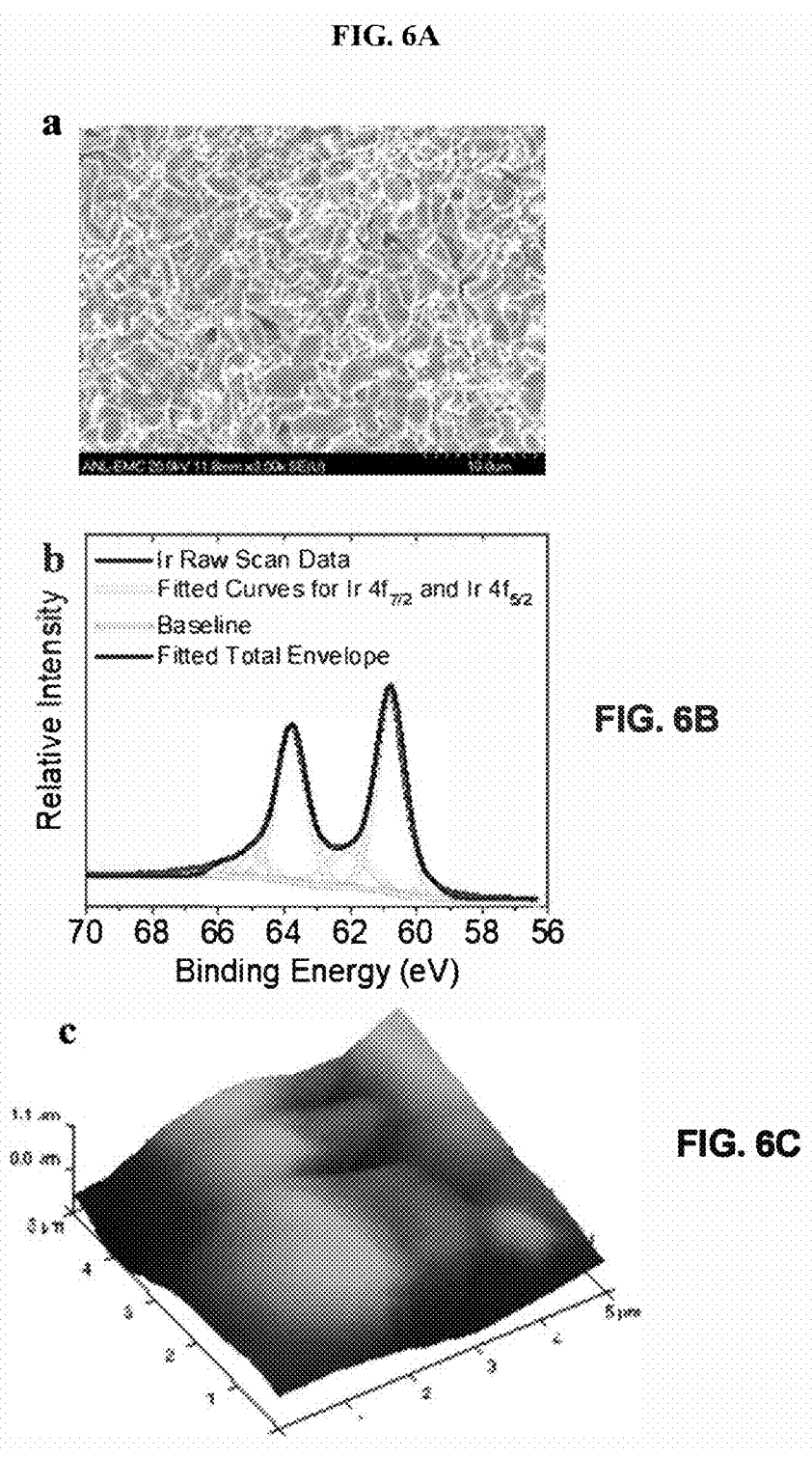
FIG. 6A shows the SEM image of the as synthesized $Ir_3Li$, illustrating many particles that clustered together.
FIG. 6B shows the XPS of pristine Ir powders (black trace) showing three components of Ir $4f_{7/2}$ peak at binding energy (BE) 60.78 eV [Ir(0)], 62.08 eV [$IrO_2$], and 62.78 eV [unknown impurity], all in gray traces, respectively. Dark gray trace is the baseline.
FIG. 6C shows the 3D morphology map of $Ir_3Li$ ($5\times5$ μm), showing particles ~1-3 microns.

SEM characterization. The $Ir_3Li$ morphology was studied by SEM. Cathode morphology can significantly affect the $LiO_2$ and $Li_2O_2$ discharge product chemistry and morphology [14,15]. The SEM results for the synthesized $Ir_3Li$ particles is shown in FIG. 6A. The as-synthesized $Ir_3Li$ was composed of non-uniform ~2-10 μm particles. The reduction of $Ir_3Li$ particle size compared to the starting iridium particle size (~100 μm) could be caused by the high temperature synthesis method, which allowed Li diffusion (Li atomic radius 0.152 nm) through the Ir particles (Ir atomic radius 0.135 nm) [16]. This process led to break-down of the iridium particles. The $Ir_3Li$ particles were later broken down by mechanical grinding using an ultra-hard boron carbide mortar and pestle. The resulting particles, shown in FIG. 1B, ranged from 200 nm to 5 μm. The large particle size may not be necessarily optimized for a Li—$O_2$ cell in terms of rate capability and capacity [17]. However, as further explained, they are effective for stabilizing large $LiO_2$ deposits during cell discharge.

XPS characterization. The XPS spectrum of $Ir_3Li$ powders is shown in FIG. 1C. For comparison, XPS was also performed on the Ir starting material (FIG. 6B). The doublet located around a binding energy 60 eV can be assigned as the Ir $4f_{7/2}$ and $4f_{5/2}$ absorptions, with a separation of 3.0 eV that is consistent with the standard value of 2.98 eV [18]. The $4f_{7/2}$ peak of Ir is deconvoluted into three components: 60.78, 62.08, and 62.78 eV, respectively. These correspond to Ir metal $Ir^0$, which is the main component, $IrO_2$ ($Ir^{+4}$) as a surface oxidized Ir species, and an unknown trace impurity. The $Ir_3Li$ Ir $4f_{7/2}$ peak is downward shifted to 59.98, and 61.28 eV for $Ir_3^-$ and $Ir^0$, respectively. XPS chemical shifts are typically correlated to the oxidation state of the specific element with higher binding energy related to high oxidation state. Compared to that of the $Ir^0$ with binding energy 60.8 eV, the 59.98 eV peak suggests that Ir atoms in $Ir_3Li$ contain a more negative charge compared to Ir atoms in $Ir^0$. An Ir that carries negative charge is rare and quite reactive, but has been reported previously such as $Na[Ir(CO)_4]$ (Ir formally −1) and $Na_3[Ir(CO)_3]$ (Ir formally −3) [19]. These metal carbonyl anions are typically strong reducing agents [20]. Charge distribution computed by DFT calculations based on Bader Charge Analysis aligned with these experimental XPS results. DFT analysis suggested the following charge distribution: Li~+0.81e, while Ir are ~−0.25e (two Ir) and −0.31e (one Ir) due to asymmetric position of Ir sites. The negative Ir charge in $Ir_3Li$ provided the material with a higher tendency to donate electrons. As a result, the oxygen reduction reaction (ORR) reaction may be more facile when occurring on $Ir_3Li$ surfaces compared to $Ir^0$.

CAFM characterization. CAFM analysis was also performed on the $Ir_3Li$ particles inside of an Ar-filled glovebox to determine the electrical conductivity of the material, which is important for its use as an electrode.

The Conductive AFM (CAFM) was carried out with a Digital Instrument (DI, now Bruker) Nanoscope Dimension 3000 with a controller IV. The conductive tip was scanned horizontally and the dark areas in the current map indicated low conductivity due to much faster scanning tip movement across particle edges while bright areas revealed high conductivity. These low current areas well matched with the morphology image. More than five different areas were studied with consistent results. The resistance of the material was calculated based on Ohm's law (V=IR). That is, a stationary I-V scan was performed with the CAFM probe sitting on a particle with area of 11 □m dia. and 2 □m thickness. The I-V curve was linear (ΔV=ΔI·R) and the resistance, R, was calculated from the slope of the I-V curve, m, using Equation S1.

$$\frac{1}{R} = \frac{\Delta I}{\Delta V} = \frac{I_2 - I_1}{V_2 - V_1} = m \tag{S1}$$

Upon considering the length of the sample through which the current was passing and the sampling area, the resistivity (ρ) of the $Ir_3Li$ particles was $4.0 \cdot 10^{-8}$ Ωm, which was similar to iridium metal resistivity previously reported as $3.7 \cdot 10^{-8}$ Ωm [22]. The $Ir_3Li$ conductivity, σ, was then calculated from the resistivity using Equation S2.

$$\sigma = \frac{1}{\rho} \tag{S2}$$

A 3-D image showing the morphology of the $Ir_3Li$ powder sample is shown in FIG. 6C. A current map revealing conductivity of a particular region of the $Ir_3Li$ powder sample is shown in FIG. 1D. The 3D image shows the topography of $Ir_3Li$ particles ranging between 1 and 4 μm in size. The current map demonstrates uniformly high conductivity amongst the $Ir_3Li$ particles and the conductivity of $Ir_3Li$ was calculated. The $Ir_3Li$ conductivity was determined as $2.5 \cdot 10^7$ S/m, which is similar to that of Ir metal ($2.7 \cdot 10^7$ S/m) [22]. Thus, the CAFM results demonstrate the high electrical conductivity of $Ir_3Li$, which is needed for a cathode material.

SQUID measurements. To investigate the effectiveness of $Ir_3Li$ as an ORR/oxygen evolution reaction (OER) catalyst [17, 23-26] beyond its high electronic conductivity at ambient temperature, the magnetic susceptibility (χ) of $Ir_3Li$ was measured as a function of temperature between 1.8 and 110

Figures 2A, 2B, 2C, 2D, 2E:
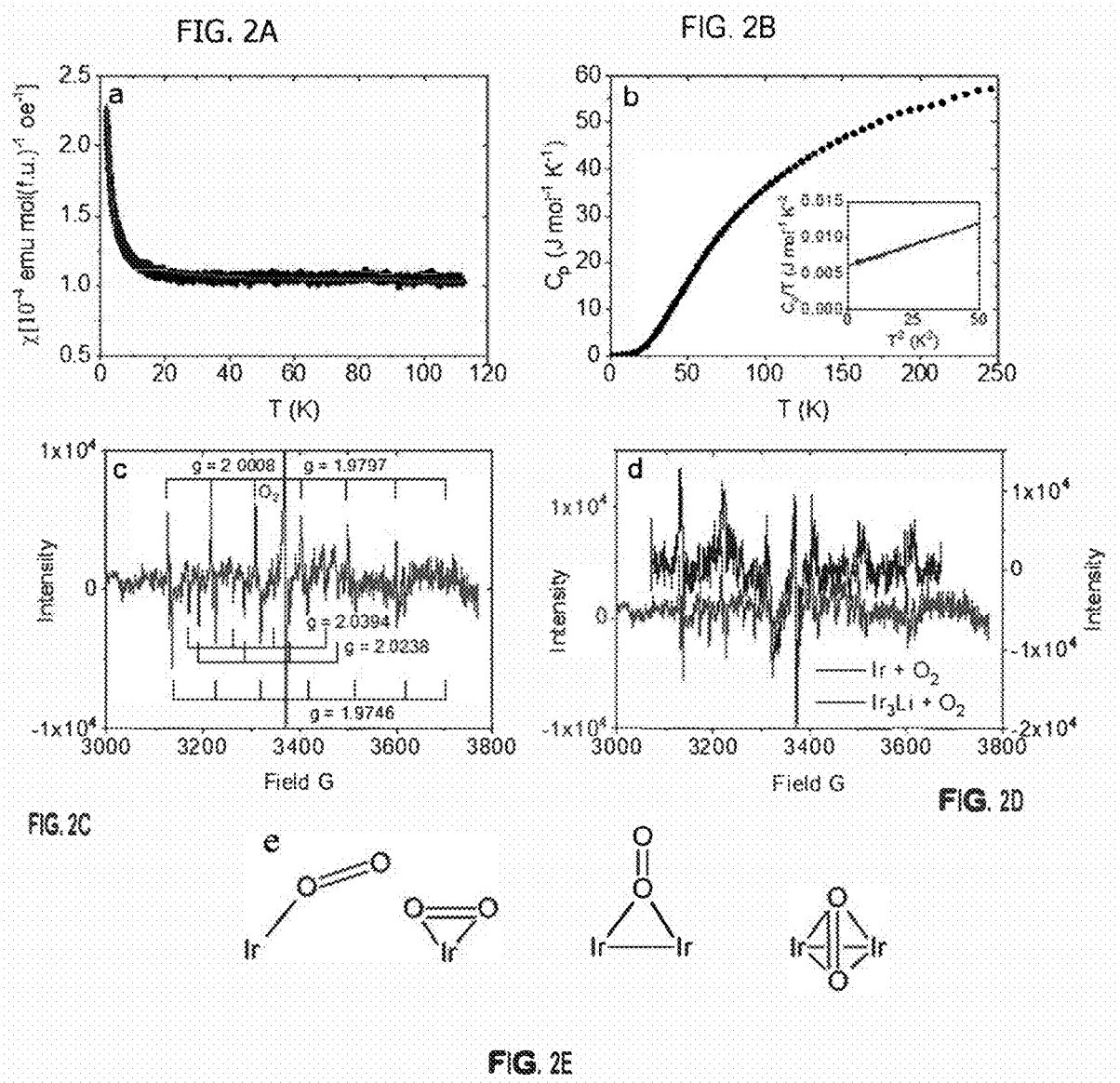
FIG. 2A shows the magnetic susceptibility (SQUID measurements) of $Ir_3Li$ (black trace) with fitted curve (gray trace).
FIG. 2B shows the heat capacity of $Ir_3Li$.
FIG. 2C shows the EPR spectrum of Ir powder in $O_2$ atmosphere at 200 K.
FIG. 2D shows the $Ir_3Li$ and Ir EPR spectrum in $O_2$ atmosphere at 100 K and 200K, respectively.
FIG. 2E shows the graphical representation of $O_2$ . . . Ir positions of non-equivalent Ir atoms.

K in a magnetic field of $\mu_0H=0.01$ T. The observed magnetic susceptibility is shown in FIG. 2A. To facilitate an estimate for the expected Pauli paramagnetic susceptibility, the heat capacity ($C_p$) was measured on a compacted pellet using the standard relaxation method. FIG. 2B shows the measured heat capacity, and the inset shows the same data in the form of $C_p/T$ vs $T^2$ in the low temperature regime ($T^2<50$ $K^2$).

From heat capacity measurements, Pauli's susceptibility was calculated to be $8.4 \times 10^{-5}$ emu $mol^{-1}$ $Oe^{-1}$. After correcting for Landau diamagnetic susceptibility $$\left(\frac{-\chi_{Pauli}}{3}\right),$$

a susceptibility of conduction electrons $\chi_{Pauli}+\chi_{Landau}=5.57 \times 10^{-5}$ emu $mol^{-1}$ $Oe^{-1}$ was obtained, which was approximately 45% smaller than the observed susceptibility from SQUID measurements ($1.0 \times 10^{-4}$ emu $mol^{-1}$ $Oe^{-1}$). Therefore, the magnetic susceptibility measurement together with heat capacity support that the temperature dependent behavior of $Ir_3Li$ is in the metallic range, which is additional support for the ORR/OER properties of $Ir_3Li$.
Pauli's Susceptibility Calculations Above ~20 K, the magnetic susceptibility was approximately constant, whereas at lower temperatures an increase was observed as the temperature was lowered, suggestive of a Curie tail. The entire temperature dependence was thus fit as a combination of a temperature-independent term ($\chi_0$) with a Curie-Weiss term, shown in Equation S3.

$$\chi = \chi_0 + \frac{C}{T - \theta} \tag{S3}$$

where C is the Curie Constant. The fit, shown in FIG. 2A, yielded a Curie-Weiss temperature of 0.38 K and an effective moment of $0.038\mu_B$ per formula unit. These values were suggestive of a low density of non-interacting moments which might arise from defects and/or a trace number of impurities. The fitted $\chi_0$ per formula unit was $1.0 \times 10^{-4}$ emu $mol^{-1}$ $Oe^{-1}$; while this could be interpreted as consistent with metallic Pauli paramagnetism, the raw measured moments in the regime dominated by $\chi_0$ (~$6 \times 10^{-7}$ emu) were small and may be affected by the container background.
Heat Capacity Measurements In the low temperature limit, the heat capacity of a metal is anticipated to take the form of Equation S4.

$$C_p = \gamma T + \beta T^3 \tag{S4}$$

where γT represents the electronic contribution (γ is the Sommerfeld coefficient) and $\beta T^3$ represents the lattice contribution in a Debye model. Thus, the intercept and slope of the inset yield γ and β, which were determined by fitting to be 6.09 mJ $mol^{-1}$ $K^{-2}$ and 0.119 mJ $mol^{-1}$ $K^{-4}$, respectively. From the value of β, the Debye Temperature, $\theta_D$, could be determined to be 403 K via Equation S5.

$$\theta_D = \left(\frac{234Nk_B}{\beta}\right)^{1/3} \tag{S5}$$

where N is the number of atoms per mole (here, $4N_A$). From the Sommerfeld Coefficient, the density of states at the Fermi level, $g(E_F)$, can be estimated in a free-electron approximation via Equation S6.

$$g(E_F) = \frac{3\gamma}{\pi^2 k_B^2} \qquad (S6)$$

In a free-electron model, the Pauli susceptibility is then proportional to $g(E_F)$, as shown in Equation S7.

$$\chi_{Pauli} = \mu_B^2 g(E_F) = \frac{3\gamma \mu_B^2}{\pi^2 k_B^2} \qquad (S7)$$

This leads to a calculated value of $\chi_{Pauli}$ of $8.4 \times 10^{-5}$ emu $mol^{-1}$ $Oe^{-1}$.

EPR Characterization. EPR measurements were carried out between room temperature and 100 K in order to probe the affinity of $Ir_3Li$ toward $O_2$ adsorption, which is essential to enable effective OER/ORR charge transfer in $Li—O_2$ batteries.

FIG. 2C shows the EPR spectra of Ir powder at 200 K in a 1 atm $O_2$ atmosphere and indicates that Ir powders clearly have a strong affinity toward oxygen molecules, which gives rise to the fine coupling peaks. FIG. 2D shows a comparison between the EPR spectrum of $Ir_3Li$ powders with $O_2$ (100 K) and Ir powders with $O_2$ (200 K). The EPR signals from $Ir_3Li/O_2$ have a very similar pattern compared to that of $Ir/O_2$, implying that molecular oxygen is also adsorbed onto $Ir_3Li$ in a similar fashion. The low EPR signal intensity from $Ir_3Li/O_2$ may be due to a low Ir content per surface area comparing to that of the $Ir/O_2$. The EPR results suggest that both Ir and $Ir_3Li$ powders adsorb oxygen in the gas phase. The surface adsorbed $O_2$ molecules interact with Ir and $Ir_3Li$ through two-atom (7 peaks each for [191]Ir and [193]Ir) and/or mono-atom (4 peaks each for two Ir isotopes) modes as shown in FIGS. 2C-2E. These interactions in a real $Li—O_2$ cell are expected to be similar but more complex due to competition from electrolyte (such as TEGDME and Li salt).

Figures 7A, 7B:
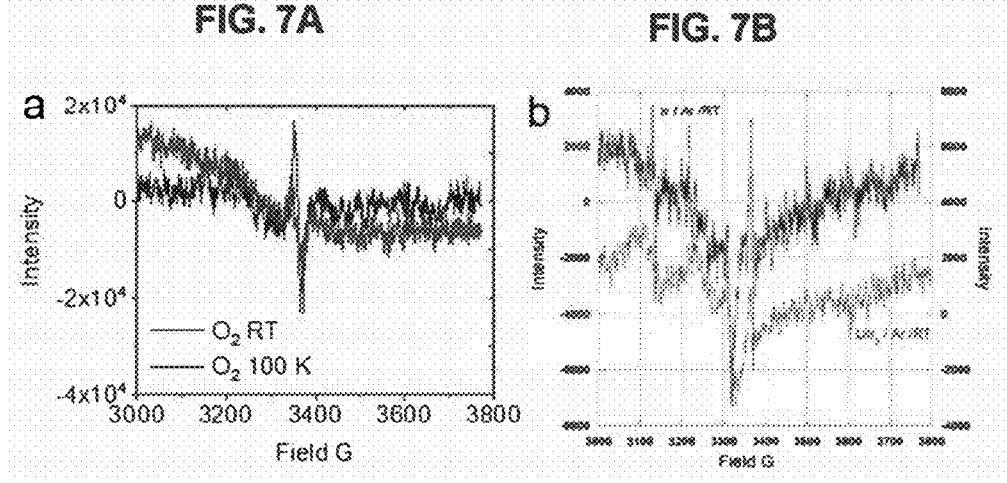
FIG. 7A shows the EPR spectra of empty tube filled with $O_2$ at room temperature (gray trace) and 100 K (stronger signal, black trace).
FIG. 7B shows the EPR spectra of iridium (black trace) and $Ir_3Li$ (gray trace) in argon atmosphere at room temperature.

As shown in FIG. 7A, one atmosphere $O_2$ at room temperature and 100 K gave a distorted EPR signal with an apparent peak-to-peak linewidth of 16.6 G (100 K, g=2.0067). This EPR signal originated from the triplet ground state of $O_2$ molecules. FIG. 7B shows results for commercial Ir powders (~2 mg) under argon. Comparing to Ir powders under $O_2$ (FIG. 3C), the EPR signals for Ir under Ar are very similar but much weaker. This observation suggests that the signals are coming from $O_2$ molecules that physiosorbed on the Ir surface. A notable sharp peak ($\Delta H_{p-p}$~4 G, g=2.0008) near the center field can be attributed to low concentration of $O_2$ such as adsorbed surface $O_2$. The sharper nature comparing to free 1 atm $O_2$ (FIG. 7A) is due to lower $O_2$ concentration in the presence of Ir powders and dipole-dipole interactions between paramagnetic centers and exchange sharpening [2]. Many additional sharp but weak peaks may be due to trace amount of surface adsorbed $O_2$ that coupled to Ir (vide infra). In FIG. 7B shows $Ir_3Li$ powders (~3 mg) under argon. A similar sharp peak in the middle (physiosorbed $O_2$ on surface) and a few broad pumps were noticed. As shown in FIG. 7B, the EPR spectrum of $Ir_3Li$ under Ar at ambient temperature only revealed an adsorbed $O_2$ peak near the center field.

As shown in FIG. 2C, the EPR spectrum of Ir powder in 1 atm $O_2$ was fully developed at 200 K. The strong and sharp peak in the middle ($\Delta H_{p-p}$, 2.5 G) of FIG. 2C can be attributed to triplet $O_2$ ($^3\Sigma$) which was the ground state of molecular $O_2$. The sharp linewidth of 2.5 G in contrast to the distorted and broad linewidth of 16.6 G implied most of the $O_2$ were adsorbed onto the Ir powders [3]. There were two sets of septuplets due to $O_2$ molecule coupled to two Ir atoms (I=3/2, 2nI+1=7, g=1.9797 and 1.9746). The two sets were likely caused by the natural abundance of Ir isotopes ([191]Ir-37.4% and [193]Ir 62.6%). The probability of Ir—Ir neighbor approximately follows [193]Ir-[193]Ir, [193]Ir-[191]Ir, and [191]Ir-[191]Ir=0.392, 0.234, and 0.140, respectively. In addition, there were two more sets of quartets resulting from molecular $O_2$ coupled to a single Ir atom (2nI+1=4). The two sets of quartets were also caused by the same Ir naturally existed isotopes (g=2.0394 and 2.0238). $O_2$ adsorption may take either end-on or bridging mode as shown in FIG. 2e that would further broaden the EPR signals.

Figures 3A, 3B, 3C:
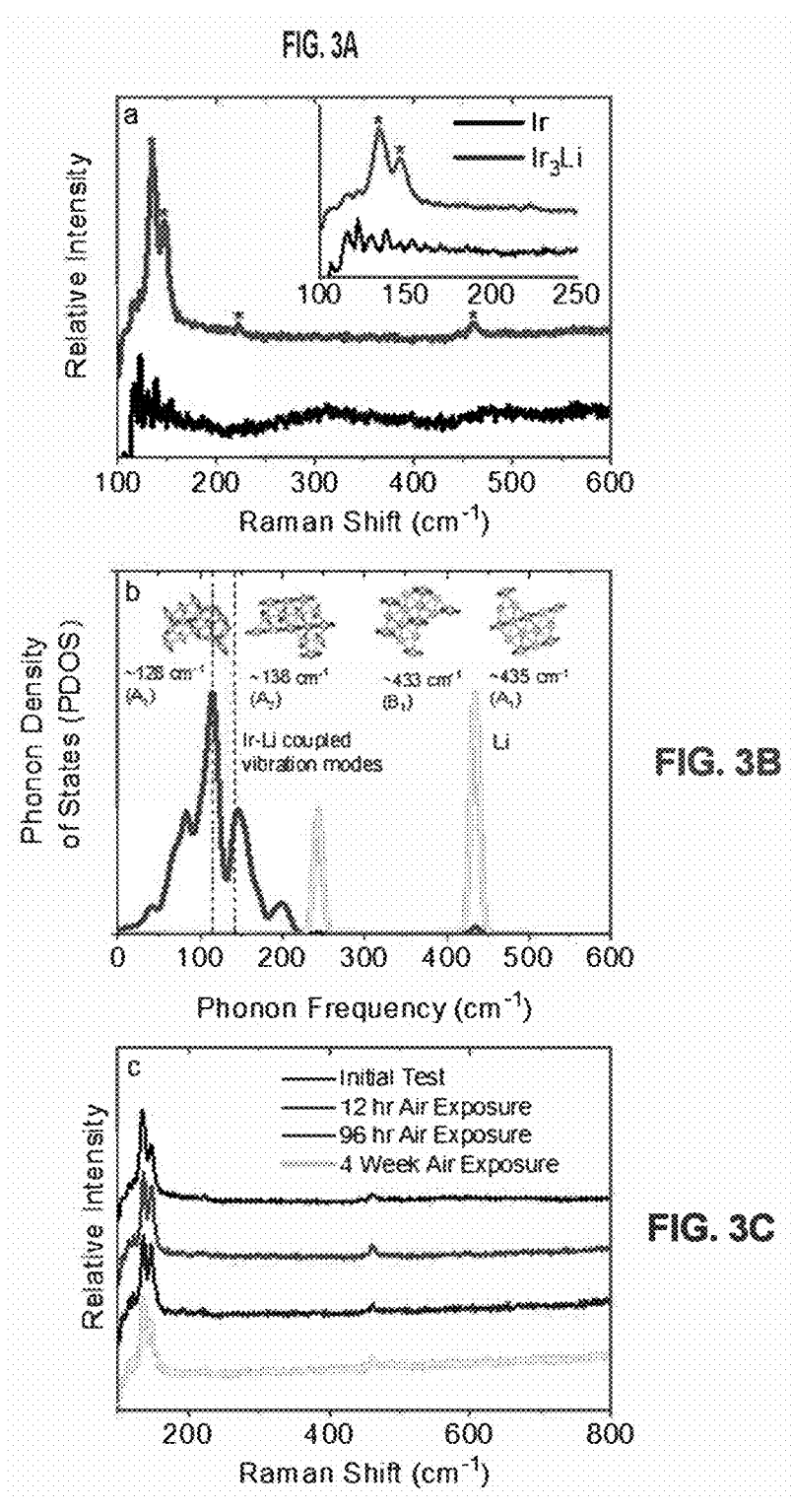
FIG. 3A shows the Raman shift of Ir (black trace) starting material and synthesized $Ir_3Li$ powder (gray trace).
FIG. 3B shows the calculated phonon density of states of $Ir_3Li$ with Ir—Li coupled modes (black trace) and vibration modes dominated by Li (gray trace).
FIG. 3C shows the Raman spectra of $Ir_3Li$ powder during extended exposure to air.
Figure 8:
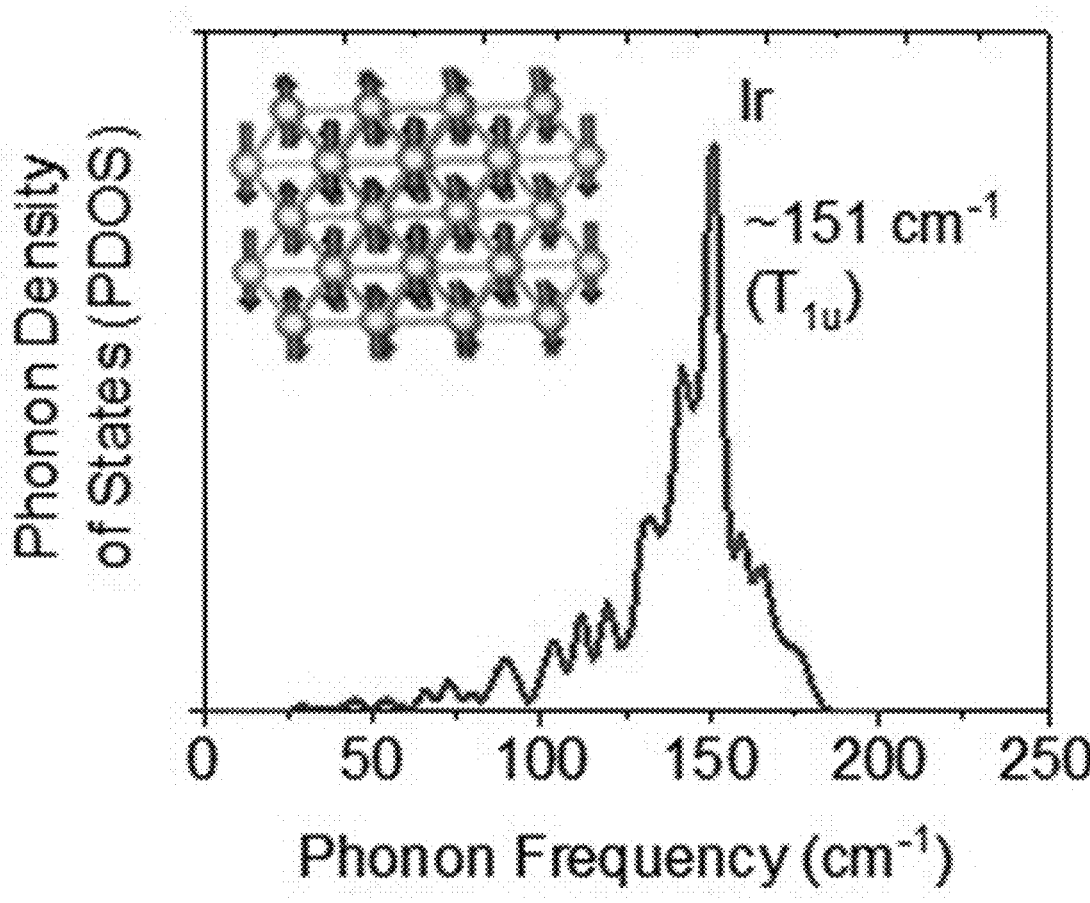
FIG. 8 shows the DFT calculated phonon density of states of iridium with major vibration mode.

Raman Characterization. Micro-Raman spectroscopy was performed on the $Ir_3Li$ powder to determine its spectra compared to Ir metal and to investigate its stability in $O_2$. The Raman spectra is shown in FIG. 3A, with comparison to the Ir nanoparticle raw material. Raman signals for $Ir_3Li$ are located at 134.7, 147.0, 222.3, and 462.6 $cm^{-1}$. The phonon density of states of $Ir_3Li$ crystals were calculated using DFT and are shown in FIG. 3B. The calculated Raman frequencies below 200 $cm^{-1}$ are associated with Ir—Li coupled vibrational $A_1$ and $A_2$ modes. The high frequency Raman modes are associated with $A_1$ and $B_1$ vibrational modes dominated by Li in the lattice. The phonon density of states of Ir was also calculated using DFT and is shown in FIG. 8. According to the symmetry group ($O_h$ symmetry) of a perfect Ir crystal, the predicted dominant phonon vibration mode ($T_{lu}$) is at ~151 $cm^{-1}$ (FIG. 8), which is Raman inactive and is distinct from $Ir_3Li$. Thus, these results show that Raman spectroscopy can be used to differentiate $Ir_3Li$ from Ir. In addition, to probe the stability of $Ir_3Li$ to $O_2$ required for $Li—O_2$ batteries, the $Ir_3Li$ sample was exposed to an ambient atmosphere for 4 weeks. Raman measurements performed on the sample after 12 hours ("hr"), 96 hr, and 4 weeks of exposure found that the Raman spectra similar in all cases, as shown in FIG. 3C, indicating that bulk $Ir_3Li$ is stable in air for an extended period of time.

Example 3—Preparation and Electrochemical Evaluation of $IrLi_3$-rGO Cathodes To make battery cathodes, $Ir_3Li$ was first ground for 30 minutes using an ultra-hard boron carbide mortar and pestle to separate the partially sintered particles. The $Ir_3Li$-rGO positive electrodes were fabricated by first mixing rGO (reduced Graphene Oxide, carbon >75 wt. %, Sigma Aldrich) and $Ir_3Li$ powder in a 1:1 ratio, with N-methyl-2-pyrrolidone (NMP) and polyvinylidene fluoride (PVDF) binder so that the mass ratio of $Ir_3Li$-rGO to PVDF was 9:1. The slurry was mixed for 30 min using a mortar and pestle. The mixture was then coated onto a gas-diffusion layer (GDL) disc (FuelCellEtc Sigracet 35BC and/or TGP-H-030 carbon paper, Toray) and dried under vacuum at 100° C. for 24 h. The final mass loading of $Ir_3Li$-rGO was ~0.3-0.8 $mg/cm^2$.

Example 4—Cell Performance and Discharge Product (L10) Characterization

Figures 4A, 4B, 4C, 4D:
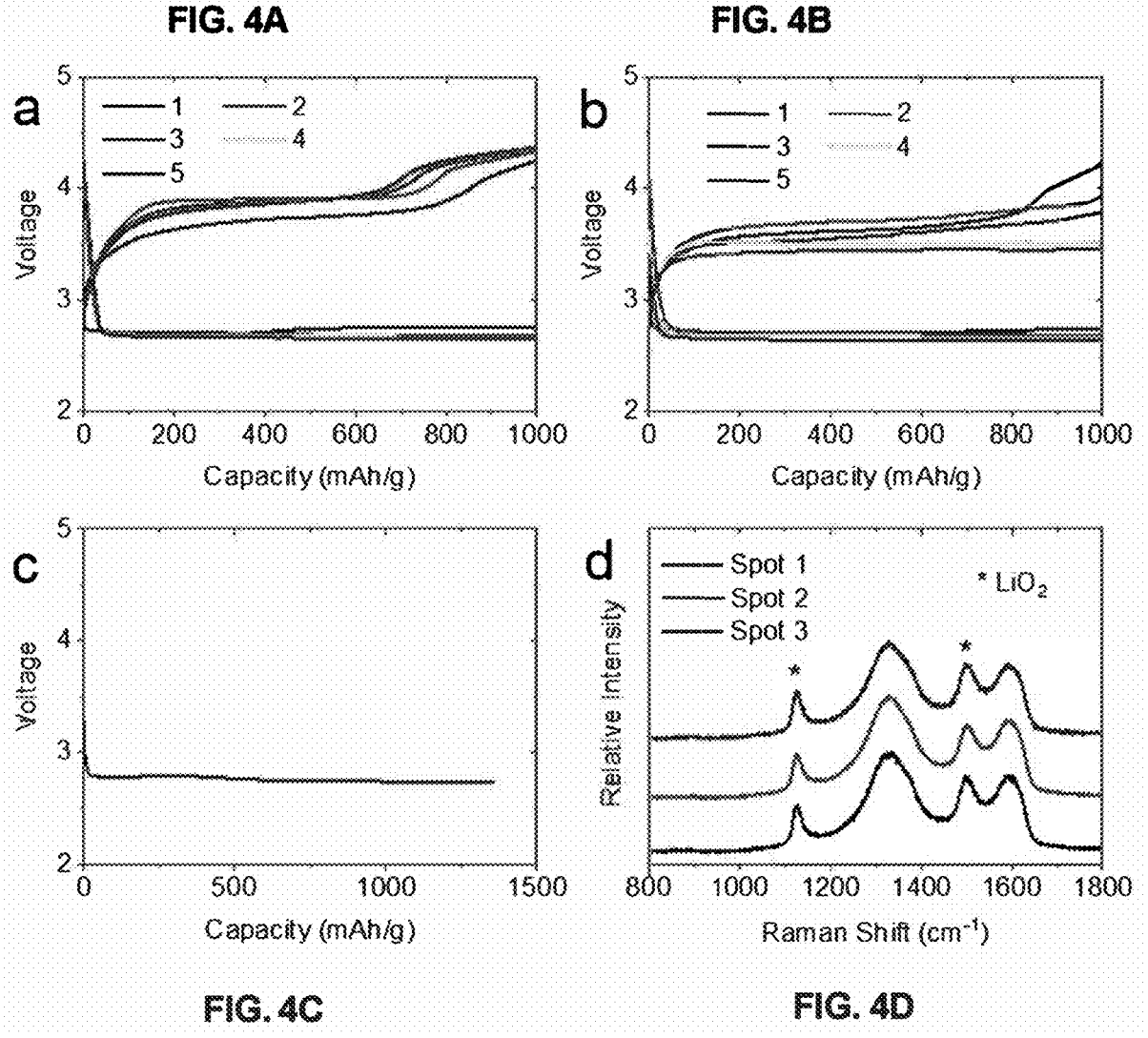
FIG. 4A shows the first five cycles of a Li—$O_2$ cell with rGO/GDL cathode, 1 M Li trifluoromethanesulfonate (Li triflate) in TEGDME electrolyte and current density 100 mA/g, illustrating a two-plateau charge profile.
FIG. 4B shows the first five cycles of a Li—$O_2$ cell with $Ir_3Li$-rGO/GDL cathode, illustrating an initial high charge potential toward the end of the 1st charge cycle which tapered down and reached a charge potential below 3.5 V by the fourth cycle. Same electrolyte and current density as (a) were applied.
FIG. 4C shows the deep discharge of $Ir_3Li$-rGO cathode in a Li—$O_2$ cell, showing the discharge potential ~2.75 V.
FIG. 4D shows the Raman spectra of deep discharged $Ir_3Li$-rGO cathode in a Li—$O_2$ cell, illustrating strong $LiO_2$ peaks at different areas.

An $Ir_3Li$ and rGO 1:1 mixture was added to a GDL (gas diffusion layer) electrode using PVDF binder to form an Ir$_3$Li-rGO cathode. The resulting cathode was assembled in a Swagelok type Li—O$_2$ cell with a Li metal anode and a 1 M Li triflate in TEGDME soaked glass fiber separator. The cell was purged with oxygen gas for 30 minutes then sealed under 1 atm of O$_2$. For comparison, a similar Li—O$_2$ cell with an rGO/GDL cathode was also assembled. Both cells were cycled at a current density of 100 mA/g and capacity of 1000 mAh/g. The first five electrochemical discharge-charge cycles are shown in FIG. 4A and FIG. 4B for the rGO/GDL and Ir$_3$Li-rGO/GDL cells, respectively. For the Li—O$_2$ cell with the rGO/GDL cathode, two charge plateaus at ~3.6-3.8 and 4.2 V were observed. For the Li—O$_2$ cell with the Ir$_3$Li-rGO/GDL cathode, the charging potential remained mostly below 3.7-3.5 V except towards the end of the first charging cycle. Since both Ir and Ir$_3$Li powders may contain trace amounts of adsorbed surface O$_2$ (see XPS and EPR sections), a small overpotential on the Ir$_3$Li-rGO/GDL cathode during the first discharge is not unexpected.

For detailed discharge product(s) characterization on the Ir$_3$Li-rGO/GDL cathode, a different cell was discharged at 62.5 mA/g current density to a capacity of 1360 mAh/g. The larger capacity experiment was performed to increase the mass of the discharge product deposited on the cathode to enable Raman and titration analysis of the discharge product (s). The voltage profile during cycling of the cell is shown in FIG. 4C. The discharge overpotential was stable between 0.15-0.25 V throughout the entire discharge, thus enabling the reasonably large capacity (>1000 mAh/g) of the cathode.

The mass of Li$_2$O$_2$ present on a discharged Ir$_3$Li-rGO electrode was determined using titration with titanium oxysulfate solution Ti(IV)OSO$_4$ (1.9-2.1%, Sigma-Aldrich) coupled with Ultraviolet-visible spectroscopy (UV-Vis). The discharged cathode was removed from the Swagelok type Li—O$_2$ cell in an argon filled glove box. After drying for 30 minutes in the glove box, the cathode was placed inside an air-tight glass vial capped with a silicone septum. The vial was removed from the glovebox and 1 mL of Ti(IV)OSO$_4$ solution was injected into the vial through the septum. The vial was swirled for 30 s without removing the syringe to limit air exposure. The entire solution was then withdrawn from the vial and added to a 1 mL quartz cuvette. A control solution of Ti(IV)OSO$_4$ was also added to a second identical cuvette. Dual beam UV-Vis was performed across a wavelength of 350-800 nm. The absorbance was then correlated to a Li$_2$O$_2$ discharge product mass using a previously reported calibration curve [9].

Figure 9:
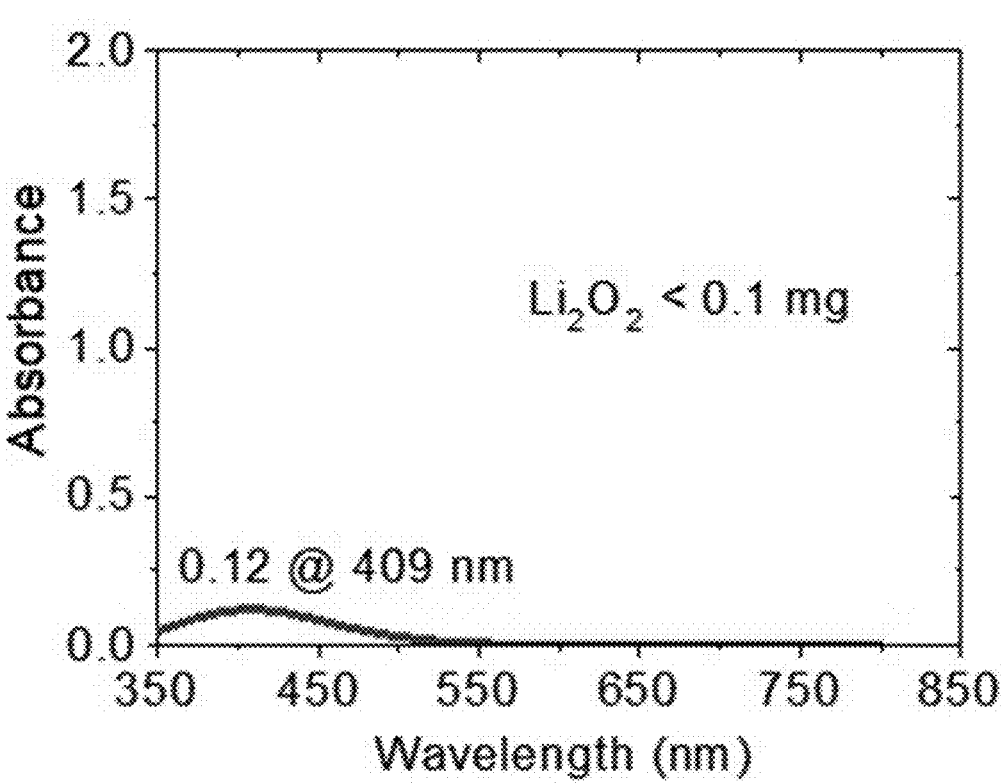
FIG. 9 shows the UV-Vis absorbance curve of titrant resulting from deep discharge cathode $Li_2O_2$ titration.

After discharge, the cell was disassembled inside an argon filled glovebox. The cathode with discharge product(s) was dried inside the glovebox, cut in half, and subjected to micro-Raman and titration analysis with Ti(IV)OSO$_4$ followed by UV-Vis of the titrant in order to determine the chemistry of the discharge product. The UV-Vis absorbance curve and micro-Raman spectra are shown in FIG. 9 and FIG. 4D respectively. The titrant absorbance value of 0.12 indicated that the presence of Li$_2$O$_2$ was negligible on the discharged cathode. Raman spectra were collected on several different areas and demonstrated strong LiO$_2$ characteristic peaks at 1125 and 1505 cm', along with the characteristic rGO/graphitic peaks at 1328 and 1596 cm$^{-1}$ [27]. These results indicate that LiO$_2$ was the dominant discharge product formed during the deep discharge of a Li—O$_2$ cell incorporating an Ir$_3$Li-rGO cathode.

Figures 5A, 5B, 5C, 5D, 5E:
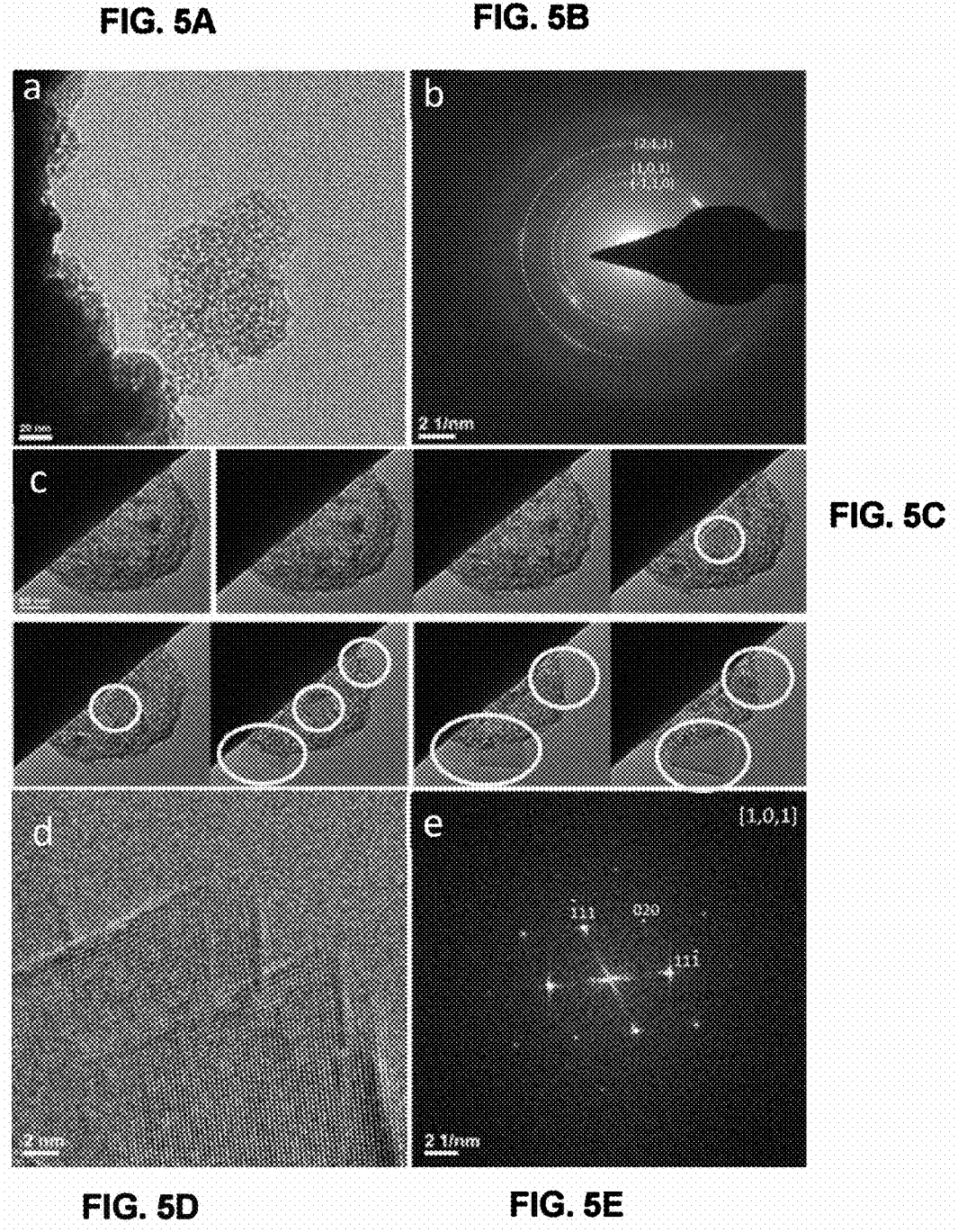
FIG. 5A shows the low resolution TEM image of the discharge product particle.
FIG. 5B shows the electron diffraction pattern of the discharge product particle ($LiO_2$).
FIG. 5C shows the TEM image snapshots during electron beam irradiation of the discharge product particle.
FIG. 5D shows the high resolution image of particle formed during electron beam irradiation of the discharge product (particle circled in white in last video tile).
FIG. 5E shows the electron diffraction pattern of $Li_2O$ particle formed during electron beam irradiation of initial discharge product.

A similar deep discharge was used for investigation of the product(s) by TEM. A low-resolution TEM image of a representative ~80×100 nm large raspberry-shaped discharge product that was attached to the cathode surface is shown in FIG. 5A. The raspberry-shaped secondary particle consisted of smaller primary particles of less than about 5 nm. Additional secondary particles with similar morphologies were also observed on the surface of the larger cathode particles, one of which is shown in FIG. 5C. Selected area electron diffraction (SAED) was performed on the raspberry shaped particle shown, and the diffraction pattern is provided in FIG. 5B. The SAED pattern of the particle is consistent with that of ($\bar{1}$10), (101), and (211) LiO$_2$ surfaces. The TEM images taken at 80 kV, shown in FIG. 5, were collected over a two-day time frame, indicating that the LiO$_2$ particles are thermodynamically stable.

The discharge product morphology was made up of small primary particles that appear to be connected together via amorphous regions to form much larger secondary particles, which suggested several possible formation mechanisms. Previously, experimental and theoretical investigations of other types of materials grown in solution have demonstrated that similar morphologies result from the primary nucleation and growth of crystalline particles from solution, and subsequent diffusion-controlled agglomeration of these primary particles or 'secondary nucleation' of new particles on primary particles [28,29]. In the case of the Ir$_3$Li cathode material in the Li—O$_2$ cell, the discharge resulted in the formation of secondary particles of ~200 nm in size. These secondary particles were comprised of the very small (<5 nm) primary particles and amorphous regions between them, and were referred as ultra-nanocrystalline lithium superoxide (UNLS).

The UNLS particles were stable under low electron beam accelerating voltage (80 kV), however, they underwent reaction during a high voltage electron beam (200 kV). FIG. 5C is a combination of selected snapshots taken from the electron irradiation of a large hemispheric UNLS particle greater than 200 nm in diameter. It was observed that the original hemispheric UNLS particle reduced in size and new platelet particles formed on the surface of the original particle. Small platelet particles dissolved and redeposited onto larger particles. One platelet particle could grow to 90×70 nm in size. A high-resolution image of the newly formed platelet particle is shown in FIG. 5D. It was observed that the platelet particle was highly crystalline. Electron diffraction was performed on the particle. The diffraction pattern, shown in FIG. 5E, aligned with that of ($\bar{1}$11), (11$\bar{1}$), and (020) diffraction peaks of Li$_2$O (cubic, antifluoride structure). The electron beam irradiation conditions during TEM measurements were far from equilibrium and possible chemical reactions are provided in Equations S8-9. This direct TEM observation provides further evidence that the discharge product is mainly LiO$_2$, and upon high energy electron irradiation, decomposed to form Li$_2$O.

Possible Li$_x$O$_x$ Reactions during TEM Beam Irradiation.

For TEM, the irradiated electrons were typically absorbed, scattered, or passed through the thin sample. The absorbed and scattered electrons can cause sample heating. The amount of heat deposited ($\Delta Q$) is given by:

$$\Delta Q = \Delta E \left(\frac{I}{e}\right)\left(\frac{t}{\lambda}\right), \tag{S8}$$

where $\Delta E$ is the energy loss per inelastic collision per electron, I the electron beam current, e electron charge, t sample thickness, and X electron mean free path for all inelastic scattering [4]. Since the only parameter changed was the accelerating voltage from 80 to 200 kV, the increased energy loss ($\Delta E$) is the main contributor that led to chemical reaction. In other words, the heat generated at 80 kV imaging was balanced by heat loss from thermal conduction and radiation in the vacuum and sample damage was minimized. As the accelerating voltage was increased to 200 kV, the reactions from $LiO_2$ reduced to an intermediate $[LiO_2^-]$ (Equation S9a), $[LiO_2^-]$ anion neutralized with $Li^+$ to form $Li_2O_2$ (Equation S9b) occurred.

$$LiO_2 + 1\,e^- \rightarrow Li^+O_2- + 1\,e^- \rightarrow [Li^+O_2^{-2}] \qquad \text{(S9a)}$$

$$[Li^+O_2^{-2}] + LiO_2 \rightarrow Li_2O_2 + [O_2-] \qquad \text{(S9b)}$$

$$2\,Li_2O_2 \rightarrow 2\,Li_2O + O_2 \qquad \text{(S9c)}$$

$$Li_2O_2 + 2\,e^- \rightarrow [Li_2O_2^{-2}] \rightarrow Li_2O + [O^{2-}] \qquad \text{(S9d)}$$

Since $Li_2O_2$ is an electronic insulator with large band gap, its thermal conductivity is expected to be much lower than that of the $LiO_2$ and the heat dissipation will be hindered. In fact, $Li_2O_2$ is reported to undergo thermally activated decomposition/disproportionation to form $Li_2O$ and $O_2$ (Equation S9c) with onset temperature ~340-348° C. with thermogravimetric analysis (TGA) and differential thermal analysis (DTA) [30]. Report with use of in-situ XRD and XPS measurements further narrowed the $Li_2O_2$ structural change onset temperature down to 280° C. [31]. Alternatively, $Li_2O_2$ under electron irradiation may form another intermediate $[Li_2O_2^{2-}]$ that dissociated into $Li_2O$ and $O^{2-}$ (Equation S9d).

The results described herein show that large $LiO_2$ particles were grown and they were remarkably stable. The growth of these large UNLS particles may be due to the use of large (up to 2 μm size) $Ir_3Li$ particles for the cathode that results in ORR as well as nucleation/growth on the same substrate. These results differ from previous studies that used cathodes with small Ir nanoparticles (~2 nm) loaded onto an rGO support, where ORR and growth/nucleation are likely occurring on separate materials [4].

REFERENCES

[1] D. Aurbach, B. D. McCloskey, L. F. Nazar, P. G. Bruce, Advances in understanding mechanisms underpinning lithium-air batteries, Nat. Energy. 1 (2016) 16128. https://doi.org/10.1038/nenergy.2016.128.

[2] T. Liu, J. P. Vivek, E. W. Zhao, J. Lei, N. Garcia-Araez, C. P. Grey, Current Challenges and Routes Forward for Nonaqueous Lithium-Air Batteries, Chem. Rev. 120 (2020) 6558-6625. https://doi.org/10.1021/acs.chemrev.9b00545.

[3] J. Chen, J. S. Hummelshoj, K. S. Thygesen, J. S. G. Myrdal, J. K. Norskov, T. Vegge, The role of transition metal interfaces on the electronic transport in lithium-air batteries, Catal. Today. 165 (2011) 2-9. https://doi.org/10.1016/j.cattod.2010.12.022.

[4] A. Halder, H.-H. Wang, K. C. Lau, R. S. Assary, J. Lu, S. Vajda, K. Amine, L. A. Curtiss, Identification and Implications of Lithium Superoxide in Li—O 2 Batteries, ACS Energy Lett. 3 (2018) 1105-1109. https://doi.org/10.1021/acsenergylett.8b00385.

[5] J. Lu, Y. Jung Lee, X. Luo, K. Chun Lau, M. Asadi, H.-H. Wang, S. Brombosz, J. Wen, D. Zhai, Z. Chen, D. J. Miller, Y. Sub Jeong, J.-B. Park, Z. Zak Fang, B. Kumar, A. Salehi-Khojin, Y.-K. Sun, L. A. Curtiss, K. Amine, A lithium-oxygen battery based on lithium superoxide, Nature. 529 (2016) 1-7. https://doi.org/10.1038/nature16484.

[6] B. Lee, J. Kim, G. Yoon, H.-D. Lim, I.-S. Choi, K. Kang, Theoretical Evidence for Low Charging Overpotentials of Superoxide Discharge Products in Metal-Oxygen Batteries, Chem. Mater. 27 (2015) 8406-8413. https://doi.org/10.1021/acs.chemmater.5b03877.

[7] S. Li, J. Liu, B. Liu, First-Principles Study of the Charge Transport Mechanisms in Lithium Superoxide, Chem. Mater. 29 (2017) 2202-2210. https://doi.org/10.1021/acs.chemmater.6b05022.

[8] S. T. Plunkett, H. Wang, S. H. Park, Y. J. Lee, J. Cabana, K. Amine, S. Al-hallaj, B. P. Chaplin, L. A. Curtiss, Charge Transport Properties of Lithium Superoxide in Li—O2 Batteries, ACS Appl. Energy Mater. (2020) 3, 12575-12583. https://dx.doi.org/10.1021/acsaem.0c02495

[9] H.-H. Wang, Y. J. Lee, R. S. Assary, C. Zhang, X. Luo, P. C. Redfern, J. Lu, Y. J. Lee, D. H. Kim, T.-G. Kang, E. Indacochea, K. C. Lau, K. Amine, L. A. Curtiss, Lithium Superoxide Hydrolysis and Relevance to Li—O 2 Batteries, J. Phys. Chem. C. 121 (2017) 9657-9661. https://doi.org/10.1021/acs.jpcc.6b12950.

[10] A. Halder, A. T. Ngo, X. Luo, H. H. Wang, J. G. Wen, P. Abbasi, M. Asadi, C. Zhang, D. Miller, D. Zhang, J. Lu, P. C. Redfern, K. C. Lau, R. Amine, R. S. Assary, Y. J. Lee, A. Salehi-Khojin, S. Vajda, K. Amine, L. A. Curtiss, In Situ Formed Ir3Li Nanoparticles as Active Cathode Material in Li-Oxygen Batteries, J. Phys. Chem. A. 123 (2019) 10047-10056. https://doi.org/10.1021/acs.jpca.9b06875.

[11] H. C. Donkersloot, J. H. N. V. A. N. Vucht, The crystal structure of IrLi, Ir3Li and LiRh3, J. Less-Common Met. 50 (1976) 279-282.

[12] B. J. Sangster, A. D. Pelton, The Ir—Li (Iridium-Lithium) System, J. Phase Equilibria. 13 (1992) 59-62.

[13] G. Kresse, J. Furthmilller, Efficiency of ab-initio total energy calculations for metals and semiconductors using a plane-wave basis set, Comput. Mater. Sci. 6 (1996) 15-50. https://doi.org/10.1016/0927-0256(96)00008-0.

[14] S. Samira, S. Deshpande, C. A. Roberts, A. M. Nacy, J. Kubal, K. Matesić, O. Oesterling, J. Greeley, E. Nikolla, Nonprecious Metal Catalysts for Tuning Discharge Product Distribution at Solid-Solid Interfaces of Aprotic Li—O2 Batteries, Chem. Mater. 31 (2019) 7300-7310. https://doi.org/10.1021/acs.chemmater.9b01817.

[15] J. Lu, L. Cheng, K. C. Lau, E. Tyo, X. Luo, J. Wen, D. Miller, R. S. Assary, H. H. Wang, P. Redfern, H. Wu, J. B. Park, Y. K. Sun, S. Vajda, K. Amine, L. A. Curtiss, Effect of the size-selective silver clusters on lithium peroxide morphology in lithium-oxygen batteries, Nat. Commun. 5 (2014) 1-8. https://doi.org/10.1038/ncomms5895.

[16] J. F. Shackelford, Introduction to Materials Science for Engineers, 8th ed., Pearson, 2015. http://web.utk.edu/~prack/mse201/Chapter 5 Diffusion .pdf.

[17] J.-J. Xu, Z.-L. Wang, D. Xu, L.-L. Zhang, X.-B. Zhang, Tailoring deposition and morphology of discharge products towards high-rate and long-life lithium-oxygen batteries, Nat. Commun. 4 (2013) 1-10. https://doi.org/10.1038/ncomms3438.

[18] J. F. Moulder, W. F. Stickle, P. E. Sobol, K. D. Bomben, Handbook of X-ray Photoelectron Spectroscopy Edited by, Perkin-Elmer Corp, Eden Prairie, M N, 1992.

[19] J. M. Allen, W. W. Brennessel, C. E. Buss, J. E. Ellis, M. E. Minyaev, M. Pink, G. F. Warnock, M. L. Winzenburg, V. G. Young, Synthesis, isolation, and characterization of trisodium tricarbonyliridate (3-), Na3[Ir(CO)3]. Initial studies on its derivative chemistry and structural characterizations of trans-[Ir(CO)3(EPh3)2]-, E=Ge, Sn, and trans-[Co(CO)3(SnPh3)2]-, Inorg. Chem. 40 (2001) 5279-5284. https://doi.org/10.1021/ic0105011.

[20] J. E. Ellis, Metal carbonyl anions: From $[Fe(CO)_4]_2$- to $[Hf(CO)_6]_2$- and beyond, Organometallics. 22 (2003) 3322-3338. https://doi.org/10.1021/om0301051.

[21] W. Tang, E. Sanville, G. Henkelman, A grid-based Bader analysis algorithm without lattice bias, J. Phys. Condens. Matter. 21 (2009). https://doi.org/10.1088/0953-8984/21/8/084204.

[22] R. Powell, Thermal conductivities and electrical resistivities of the platinum metals, Platin. Met. Rev. 6 (1962) 138.

[23] D. A. Agyeman, M. Park, Y. M. Kang, Pd-Impregnated NiCo2O4 nanosheets/porous carbon composites as a free-standing and binder-free catalyst for a high energy lithium-oxygen battery, J. Mater. Chem. A. 5 (2017) 22234-22241. https://doi.org/10.1039/c7ta05391f.

[24] B. Sun, X. Huang, S. Chen, P. Munroe, G. Wang, Porous graphene nanoarchitectures: An efficient catalyst for low charge-overpotential, long life, and high capacity lithium-oxygen batteries, Nano Lett. 14 (2014) 3145-3152. https://doi.org/10.1021/nl500397y.

[25] F. S. Gittleson, W. H. Ryu, A. D. Taylor, Operando observation of the gold-electrolyte interface in Li—O2 batteries, ACS Appl. Mater. Interfaces. 6 (2014) 19017-19025. https://doi.org/10.1021/a m504900k.

[26] N. A. Galiote, U. Ulissi, S. Passerini, F. Huguenin, Role Platinum Nanoparticles Play in the Kinetic Mechanism of Oxygen Reduction Reaction in Nonaqueous Solvents, J. Phys. Chem. C. (2018). https://doi.org/10.1021/acs.jpcc.8b02606.

[27] S. Perumbilavil, P. Sankar, T. Priya Rose, R. Philip, White light Z-scan measurements of ultrafast optical nonlinearity in reduced graphene oxide nanosheets in the 400-700 nm region, Appl. Phys. Lett. 107 (2015) 051104. https://doi.org/10.1063/1.4928124.

[28] A. Carino, A. Testino, M. R. Andalibi, F. Pilger, P. Bowen, C. Ludwig, Thermodynamic-Kinetic Precipitation Modeling. A Case Study: The Amorphous Calcium Carbonate (ACC) Precipitation Pathway Unravelled, Cryst. Growth Des. 17 (2017) 2006-2015. https://doi.org/10.1021/acs.cgd.7b00006.

[29] J. Baumgartner, A. Dey, P. H. H. Bomans, C. Le Coadou, P. Fratzl, N. A. J. M. Sommerdijk, D. Faivre, Nucleation and growth of magnetite from solution, Nat. Mater. 12 (2013) 310-314. https://doi.org/10.1038/nmat3558.

[30] R. A. Nefedov, Y. A. Ferapontov, N. P. Kozlova, Problem of the lithium peroxide thermal stability, IOP Conf. Ser. Mater. Sci. Eng. 112 (2016). https://doi.org/10.1088/1757-899X/112/1/012027.

[31] K. P. C. Yao, D. G. Kwabi, R. A. Quinlan, A. N. Mansour, A. Grimaud, Y.-L. Lee, Y.-C. Lu, Y. Shao-Horn, Thermal Stability of $Li_2O_2$ and $Li_2O$ for Li-Air Batteries: In Situ XRD and XPS Studies, J. Electrochem. Soc. 160 (2013) A824-A831. https://doi.org/10.1149/2.069306jes.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

Paragraph A. A process of forming $LiO_2$, the process comprising:

providing an electrochemical cell comprising a porous oxygen cathode, a lithium anode, a current collector, and an electrolyte; and discharging the electrochemical cell to form a discharge product;

wherein:

the porous oxygen cathode comprises a gas-diffusion layer electrode coated with a mixture of reduced graphene oxide (rGO) and $Ir_3Li$;

the discharge product comprises $LiO_2$; and the discharge product is substantially free of $Li_2O$ and $Li_2O_2$.

Paragraph B. The process of Paragraph A, wherein the porous oxygen cathode is a porous oxygen carbon cathode.

Paragraph C. The process of Paragraph A or B, wherein a mass ratio of $rGO:Ir_3Li$ is from about 1:1 to about 1:0.00005.

Paragraph D. The process of Paragraph C, wherein a mass ratio of $rGO:Ir_3Li$ is about 1:1.

Paragraph E. The process of Paragraphs A-D, wherein the $Ir_3Li$ comprises $Ir_3Li$ particles having a particle size of from about 200 nm to about 5 um.

Paragraph F. The process of Paragraph A-E, wherein the $LiO_2$ is crystalline $LiO_2$.

Paragraph G. The process of Paragraph A-F, wherein the $LiO_2$ is in a form of secondary particles having a particles size of greater than about 200 nm.

Paragraph H. The process of Paragraph G, wherein the secondary $LiO_2$ particles comprise $LiO_2$ primary particles having a particle size of less than about 5 nm.

Paragraph I. The process of Paragraph G, wherein the secondary $LiO_2$ particles further comprise amorphous regions between the $LiO_2$ primary particles.

Paragraph J. The process of Paragraph A-I further comprising subjecting a mixture of $Ir^0$ and $Li^0$ to elevated temperature under an inert atmosphere to form the $Ir_3Li$, and mixing the $Ir_3Li$ with the rGO.

Paragraph K. The process of Paragraph J, wherein the $Ir^0$ is $Ir^0$ powder, and the $Li^0$ is $Li^0$ foil.

Paragraph L. The process of Paragraph J, wherein the elevated temperature is a temperature from about 600° C. to 1000° C.

Paragraph M. The process of Paragraph J, wherein the subjecting is carried out for greater than 5 days.

Paragraph N. The process of Paragraph A-M, wherein a loading of the mixture on the porous oxygen carbon cathode is from about 0.2 to about 1.0 $mg/cm^2$.

Paragraph O. The process of Paragraph A-N, wherein the discharging is conducted at a current of from about 10 mA/g to about 500 mA/g, and a capacity of from about 100 mAh/g to about 2000 mAh/g.

Paragraph P. The process of Paragraph A-O, wherein the discharging is conducted in the presence of $O_2$.

Paragraph Q. The process of Paragraph A-P, wherein the electrolyte comprises an aprotic solvent and a salt.

Paragraph R. The process of Paragraph Q, wherein the salt is $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or any combination of two or more thereof, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

Paragraph S. The process of Paragraph Q, wherein the aprotic solvent is an ether-based solvent, a fluorinated ether-based solvent, an oligo(ethylene oxide) solvent, or any combination of two or more thereof.

Paragraph T. A composition comprising $LiO_2$, reduced graphene oxide (rGO), and $Ir_3Li$, wherein:

a mass ratio of rGO:$Ir_3Li$ is from about 1:1 to 1:0.00005;

the $LiO_2$ comprises primary $LiO_2$ particles formed into secondary $LiO_2$ particles;

the $LiO_2$ primary particles are less than about 5 nm;

the $LiO_2$ secondary particles are greater than 200 nm; and the composition is substantially free of $Li_2O_2$ and $Li_2O$.

Paragraph U. The composition of Paragraph T, wherein the mass ratio of rGO:$Ir_3Li$ is about 1:1.

Paragraph V. The composition of Paragraph T or U, wherein the $Ir_3Li$ is in a form of $Ir_3Li$ particles having a particle size of from about 200 nm to about 5 um.

Paragraph W. The composition of Paragraph T-V, wherein the primary $LiO_2$ and the secondary $LiO_2$ are crystalline.

Paragraph X. The composition of Paragraph W, wherein the crystalline $LiO_2$ secondary particles further comprise amorphous regions between the $LiO_2$ primary particles.

Paragraph Y. The composition of Paragraph T-X, wherein the $LiO_2$ is stable with less than 20% of $LiO_2$ decomposes after 24 hours at ambient temperature under $O_2$, Ar, or vacuum.

Paragraph Z. The composition of Paragraph T-Y, wherein the $LiO_2$ is stable with less than 1% of $LiO_2$ is decomposed under 80 kV applied voltage during TEM measurement.

Paragraph AA. An electrochemical cell comprising:

an anode comprising lithium metal;

a cathode comprising $LiO_2$, reduced graphene oxide (rGO), and $Ir_3Li$; and an electrolyte;

wherein:

a mass ratio of rGO:$Ir_3Li$ is from about 1:1 to about 1:0.00005, the cathode is substantially free of $Li_2O_2$ and $Li_2O$.

Paragraph BB. The electrochemical cell of Paragraph AA, wherein the mass ratio of rGO:$Ir_3Li$ is about 1:1.

Paragraph CC. The electrochemical cell of Paragraph AA or BB, wherein the $Ir_3Li$ is in a form of $Ir_3Li$ particles having a particle size of from about 200 nm to about 5 um.

Paragraph DD. The electrochemical cell of Paragraph AA, BB, or CC, wherein the $LiO_2$ is in a form of crystalline $LiO_2$ particles having a particles size of greater than 200 nm, wherein the electrolyte comprises a solvent and a lithium salt.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A process of forming $LiO_2$, the process comprising:

subjecting $Ir^0$ and $Li^0$ to elevated temperature under an inert atmosphere to form $Ir_3Li$, and mixing the $Ir_3Li$ with reduced graphene oxide (rGO) to form a mixture;

providing an electrochemical cell comprising a porous oxygen cathode comprising a gas-diffusion layer coated with the mixture, a lithium anode, a current collector, and an electrolyte; and discharging the electrochemical cell to form a discharge product;

wherein:

the discharge product comprises $LiO_2$; and the discharge product is substantially free of $Li_2O$ and $Li_2O_2$.

2. The process of claim 1, wherein the porous oxygen cathode is a porous oxygen carbon cathode.

3. The process of claim 1, wherein a mass ratio of rGO: $Ir_3Li$ is from about 1:1 to about 1:0.00005.

4. The process of claim 1, wherein the $Ir_3Li$ comprises $Ir_3Li$ particles having a particle size of from about 200 nm to about 5 um.

5. The process of claim 1, wherein the $LiO_2$ is crystalline $LiO_2$ and is in a form of secondary particles having a particles size of greater than about 200 nm; and wherein the secondary $LiO_2$ particles comprise $LiO_2$ primary particles having a particle size of less than about 5 nm, and amorphous regions between the $LiO_2$ primary particles.

6. The process of claim 1, wherein the $Ir^0$ is $Ir^0$ powder, and the $Li^0$ is $Li^0$ foil.

7. The process of claim 1, wherein the elevated temperature is a temperature from about 600° C. to 1000° C., and the subjecting is carried out for greater than 5 days.

8. The process of claim 1, wherein the mixture is present with the porous oxygen carbon cathode from about 0.2 to about 1.0 $mg/cm^2$.

9. The process of claim 1 wherein the discharging is conducted at a current of from about 10 mA/g to about 500 mA/g, and a capacity of from about 100 mAh/g to about 2000 mAh/g.

10. The process of claim 1, wherein the discharging is conducted in the presence of $O_2$.

11. The process of claim 1, wherein the electrolyte comprises an aprotic solvent and a salt.

12. The process of claim 11, wherein;

the salt is $LiCF_3CO_2$, $LiC_2F_5CO_2$, $LiClO_4$, $LiBF_4$, $LiAsF_6$, $LiPF_6$, $LiPF_2 (C_2O_4)_2$, $LiPF_4C_2O_4$, $LiCF_3SO_3$, $LiN (CF_3SO_2)_2$, $LiC (CF_3SO_2)_3$, $LiN (SO_2C_2F_5)_2$), lithium alkyl fluorophosphates, $Li (C_2O_4)_2$, $LiBF_2C_2O_4$, $Li_2B_{12}X_{12-p} H_p$, $Li_2B_{10}X_{10-y}H_y$, or any combination of two or more thereof, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10; and the aprotic solvent is an ether-based solvent, a fluorinated ether-based solvent, an oligo (ethylene oxide) solvent, or any combination of two or more thereof.

\* \* \* \* \*